United States Patent
Madhani et al.

(10) Patent No.: US 12,110,025 B1
(45) Date of Patent: Oct. 8, 2024

(54) VEHICLE DECELERATION SYSTEMS

(71) Applicants: Akhil J. Madhani, Portola Valley, CA (US); Dillon J. Thomasson, Cupertino, CA (US); Peteris K. Augenbergs, Woodside, CA (US); Alexander Hitzinger, Mountain View, CA (US)

(72) Inventors: Akhil J. Madhani, Portola Valley, CA (US); Dillon J. Thomasson, Cupertino, CA (US); Peteris K. Augenbergs, Woodside, CA (US); Alexander Hitzinger, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/957,487

(22) Filed: Sep. 30, 2022

Related U.S. Application Data

(63) Continuation of application No. 16/378,674, filed on Apr. 9, 2019, now Pat. No. 11,498,561.

(Continued)

(51) Int. Cl.
*B60W 30/18* (2012.01)
*B60G 17/0195* (2006.01)
(Continued)

(52) U.S. Cl.
CPC ... *B60W 30/18109* (2013.01); *B60G 17/0195* (2013.01); *B60K 7/0007* (2013.01);
(Continued)

(58) Field of Classification Search
CPC .......... B60W 30/18109; B60W 10/04; B60W 10/184; B60W 10/22; B60W 2710/18;
(Continued)

(56) References Cited

U.S. PATENT DOCUMENTS

| 4,991,698 A | 2/1991 | Hanson |
| 10,899,340 B1 | 1/2021 | Hitzinger |

(Continued)

FOREIGN PATENT DOCUMENTS

| DE | 102009030816 A1 * | 11/2010 | ............ B60T 8/1755 |
| DE | 102010017991 A1 | 10/2011 | |

(Continued)

OTHER PUBLICATIONS

Basrah et al.; Four Wheel Torque Blending for Slip Control in a Hybrid Electric Vehicle with a Single Electric Machine; 2015 International Conference on Sustainable Energy Engineering and Application (ICSEEA) (Year: 2015).*

(Continued)

*Primary Examiner* — Michael J Zanelli
(74) *Attorney, Agent, or Firm* — Young Basile Hanlon & MacFarlane, P.C.

(57) ABSTRACT

A vehicle includes a control system, a sensing system that senses an environment of the vehicle, and a propulsion system, a braking system, and a steering system that are operated by the control system to navigate the vehicle according to the sensing system and without direct human control. The propulsion system and the braking system are operated by the control system to cooperatively decelerate the vehicle. The braking system includes an inboard friction brake that is associated with one or more wheels of the vehicle and does not form unsprung mass of the vehicle.

20 Claims, 18 Drawing Sheets

Related U.S. Application Data

(60) Provisional application No. 62/654,704, filed on Apr. 9, 2018.

(51) Int. Cl.
  *B60K 7/00* (2006.01)
  *B60T 1/06* (2006.01)
  *B60T 8/17* (2006.01)
  *B60W 10/04* (2006.01)
  *B60W 10/184* (2012.01)
  *B60W 10/22* (2006.01)

(52) U.S. Cl.
  CPC ............ *B60T 1/062* (2013.01); *B60T 8/17* (2013.01); *B60W 10/04* (2013.01); *B60W 10/184* (2013.01); *B60W 10/22* (2013.01); B60K 2007/0061 (2013.01); B60T 2250/00 (2013.01); B60T 2260/09 (2013.01); B60W 2510/184 (2013.01); B60W 2555/20 (2020.02); B60W 2710/083 (2013.01); B60W 2710/18 (2013.01); B60W 2710/22 (2013.01)

(58) Field of Classification Search
  CPC ....... B60W 2710/083; B60W 2710/22; B60W 2510/184; B60W 2555/20; B60G 17/0195; B60T 8/17; B60T 1/062; B60T 2260/09; B60T 2250/00; B60K 7/0007; B60K 2007/0061
  See application file for complete search history.

(56) References Cited

U.S. PATENT DOCUMENTS

| | | | |
|---|---|---|---|
| 2007/0228822 A1* | 10/2007 | Hirata | ................. B60L 50/40 303/151 |
| 2008/0009379 A1 | 1/2008 | Steinwender | |
| 2008/0078631 A1 | 4/2008 | Erlston et al. | |
| 2016/0304038 A1* | 10/2016 | Chen | ................. B60R 16/023 |
| 2017/0106848 A1 | 4/2017 | Ritter | |
| 2017/0210244 A1 | 7/2017 | Isono et al. | |
| 2017/0241533 A1 | 8/2017 | Isono et al. | |
| 2017/0244301 A1 | 8/2017 | Isono et al. | |
| 2017/0328461 A1 | 11/2017 | Nasu et al. | |
| 2018/0215368 A1 | 8/2018 | Isono | |

FOREIGN PATENT DOCUMENTS

| | | | | |
|---|---|---|---|---|
| EP | 1062114 B1 | * | 6/2005 | ............ B60K 6/48 |
| JP | 2006141127 A | * | 6/2006 | |
| JP | 5040147 B2 | | 10/2012 | |
| KR | 20170026348 A | | 3/2017 | |
| TH | 175028 A | * | 4/2018 | ......... B60L 15/2009 |
| WO | WO-03101765 A2 | * | 12/2003 | ............ B60T 1/062 |
| WO | WO-2010101506 A1 | * | 9/2010 | ........... B60W 10/08 |
| WO | 2010133344 A2 | | 11/2010 | |

OTHER PUBLICATIONS

Monster Scooter Parts, "Transaxle, Motor, Brake, and Gearbox Assembly for ActiveCare 3310 and 3410 Prowler Mobility Scooters", https://www.monsterscooterparts.com/transaxle-motor-brake-gearbox-activecare-prowler.html, Downloaded Mar. 28, 2019, 3 pp.

Wikipedia, "Transmission Brake", https://en.wikipedia.org/wiki/Transmission_brake, Downloaded Mar. 28, 2019, 2 pp.

KEB Blog., "Electric Motor Brakes", Spring Applied Brakes for Motor OEMs, https://kebblog.com/motor-brakes/, Downloaded Mar. 28, 2019, 10 pp.

Ivanov et al., Systematization of Integrated Motion Control of Ground Vehicles, IEEE Access; 10.1109/ACCESS.2015.2496108; vol. 3, 2015; pp. 2080-2099; Nov. 9, 2015 (Year: 2015).

* cited by examiner

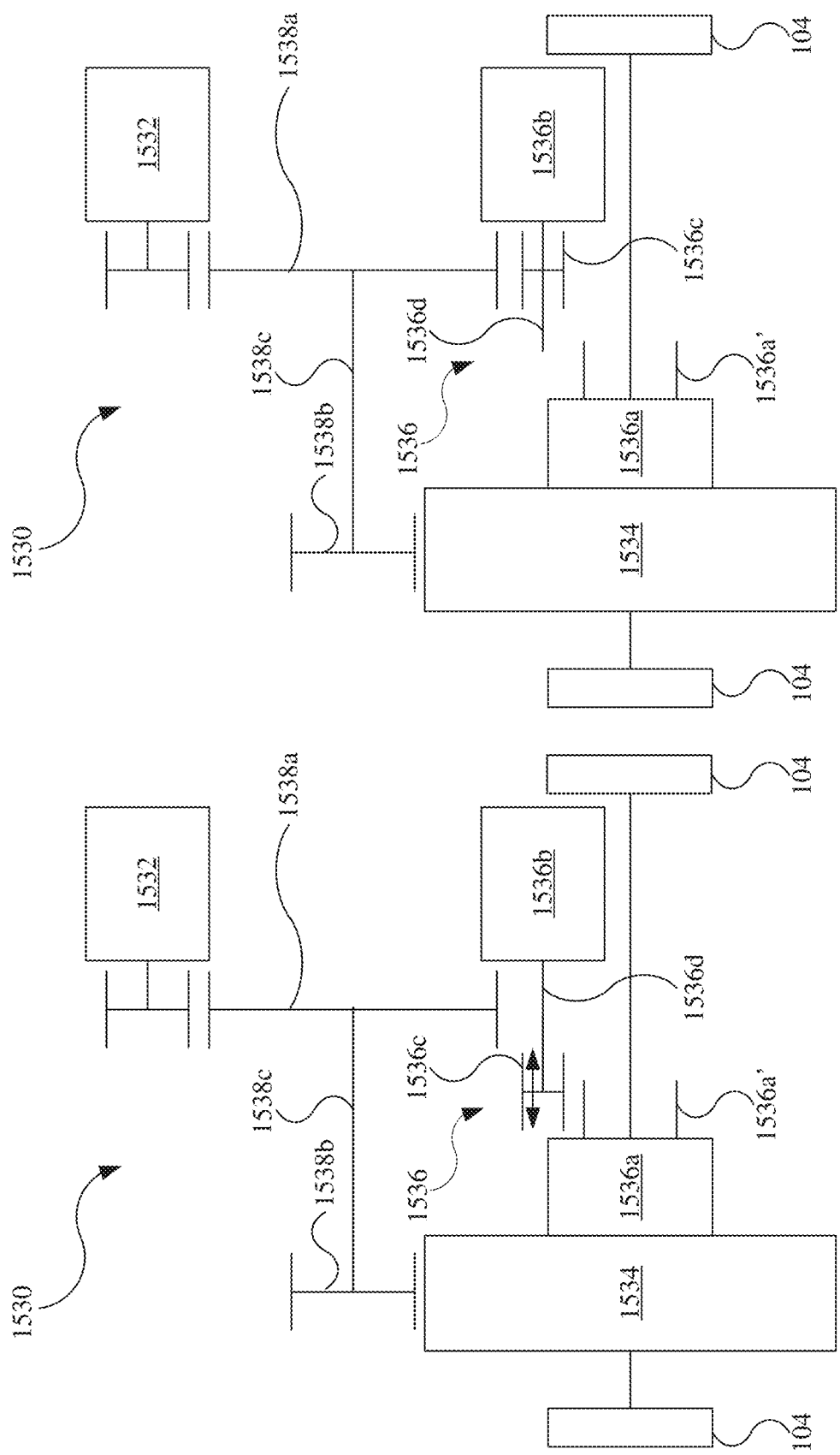

VEHICLE DECELERATION SYSTEMS

CROSS-REFERENCE TO RELATED APPLICATION(S)

This application is a continuation of U.S. application Ser. No. 16/378,674, filed on Apr. 9, 2019, which claims the benefit of U.S. Provisional Application No. 62/654,704, filed Apr. 9, 2018, the contents of which are hereby incorporated by reference in their entirety for all purposes.

TECHNICAL FIELD

This disclosure relates to vehicles and, in particular, deceleration or braking systems thereof.

BACKGROUND

A human-operated vehicle is subject to conditions consequential to the human operator's limited ability to comprehend conditions external to the vehicle, comprehend capabilities of the vehicle within such conditions, and control the vehicle according to the external conditions and the vehicle capabilities. This means that human-operated vehicles are subject to extreme usage scenarios due to the human operator's imprecise control (e.g., hard braking, delayed responses, etc.) and, consequentially, include a limited number of human-operated inputs and are engineered to account for the extreme usage scenarios. For example, the human-operated vehicle is typically limited to three primary control inputs, which include an acceleration input (e.g., accelerator pedal for controlling output of a propulsion system of the vehicle and, thereby, acceleration and speed of the vehicle), a braking input (e.g., brake pedal for controlling output of a braking system of the vehicle and, thereby, deceleration and speed of the vehicle), and a steering input (e.g., steering wheel for changing direction of wheels of the vehicle and, thereby, changing direction of the vehicle). A braking system that is human-operated, for example, may be engineered to handle repeat emergency braking maneuvers in close succession, which may require use of certain materials and/or handling of excessive thermal loads.

Human-operated vehicles may include various automated controls, which operate in limited usage scenarios and are often to correct for limitations of human operation. For example, an antilock braking system may control brake application when wheel slip is detected (e.g., with hard braking by the user in slippery road conditions), or a lane keeping assist system may prevent a vehicle from drifting outside a lane of a public roadway (e.g., if the human operator fails to recognize the curvature of a road).

SUMMARY

In an implementation, a vehicle includes a control system, a sensing system that senses an environment of the vehicle, and a propulsion system, a braking system, and a steering system that are operated by the control system to navigate the vehicle according to the sensing system and without direct human control. The propulsion system and the braking system are operated by the control system to cooperatively decelerate the vehicle. The braking system includes an inboard friction brake that is associated with one or more wheels of the vehicle and does not form unsprung mass of the vehicle.

The control system limits operation of the vehicle according to a condition of the inboard friction brake, which may include one or more of a temperature or a time from a high deceleration. The control system may limit operation of the vehicle by one or more of preventing movement or limiting speed. The vehicle may further include an active suspension system that includes actuators that are operated by the control system to move the wheels up and down relative to a body of the vehicle. The wheels of the vehicle may include front wheels and rear wheels, and the vehicle may not include outboard friction brakes that form unsprung mass at one or more of the front wheels or the rear wheels.

In an implementation, a vehicle includes a body, four wheels, a suspension system, a propulsion system, and a braking system. The four wheels include a first driven wheel and a second driven wheel. The suspension system supports the body on the four wheels. The propulsion system includes one or more motor-generators and one or more gearboxes. The first driven wheel and the second driven wheel are driven by one of the motor-generators via one of the gearboxes, a drive shaft, and a constant velocity joint. The braking system includes an inboard friction brake for decelerating one or more of the first driven wheel or the second driven wheel, which is located inboard of the constant velocity joint associated therewith. The control system cooperatively operates the propulsion system and the braking system to decelerate the vehicle.

In an implementation, a deceleration system for a vehicle includes a motor-generator, a friction brake, and a control system. The motor-generator applies a first torque to a wheel for decelerating the vehicle. The wheel forms part of an unsprung mass of the vehicle. The friction brake applies a second torque to the wheel for decelerating the vehicle. The friction brake does not form part of the unsprung mass of the vehicle. The control system controls the first torque and the second torque. In a low deceleration event, the control system operates the motor-generator to apply the first torque and does not operate the friction brake such that the second torque is zero. In a high deceleration event, the control system operates the friction brake for the second torque to be at a constant level and operates the motor-generator for the first torque to supplement the second torque.

In an implementation, a vehicle includes a body, four wheels that include a first driven wheel and a second wheel, and a propulsion system having a first motor-generator, a differential and a torque vectoring system. The first motor-generator provides a first torque to the differential for transfer to the first driven wheel and the second driven wheel. The torque vectoring system includes a second motor-generator that provides a second torque to a torque vectoring gearbox for distribution between the first driven wheel and the second driven wheel during normal operation and provides the second torque to the differential to supplement the first torque during a high deceleration event.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 15A is a schematic view of a deceleration system in a first state.

FIG. 15B is a schematic view of the deceleration system of FIG. 15A in a second state.

DETAILED DESCRIPTION

Disclosed herein are various embodiments of a vehicle 100 and functional subsystems thereof, which are autonomously controlled. With autonomous control, a user may, for example, specify a destination or route, while the various functional subsystems of the vehicle 100 are controlled autonomously for traversing public roadways and other environments to achieve the destination or route. As a result of autonomous control, the vehicle 100 and the various functional subsystems may be subject to substantially different usage scenarios than those of conventional human-operated vehicles, which may allow for substantial departures in conventional arrangements and operation of functional subsystems traditionally found in human-operated vehicles. The present disclosure is more particularly directed to various embodiments of a deceleration or braking subsystem, which may include friction brakes at inboard locations, may subject such friction brakes to significantly less frequent operation than friction brakes of human-operated vehicles, and may eliminate friction brakes at outboard locations as are found in human-operated vehicles (i.e., proximate vehicle wheels). For example, outboard friction brakes may not be included for rear wheels, front wheels, or both.

Figure 1:
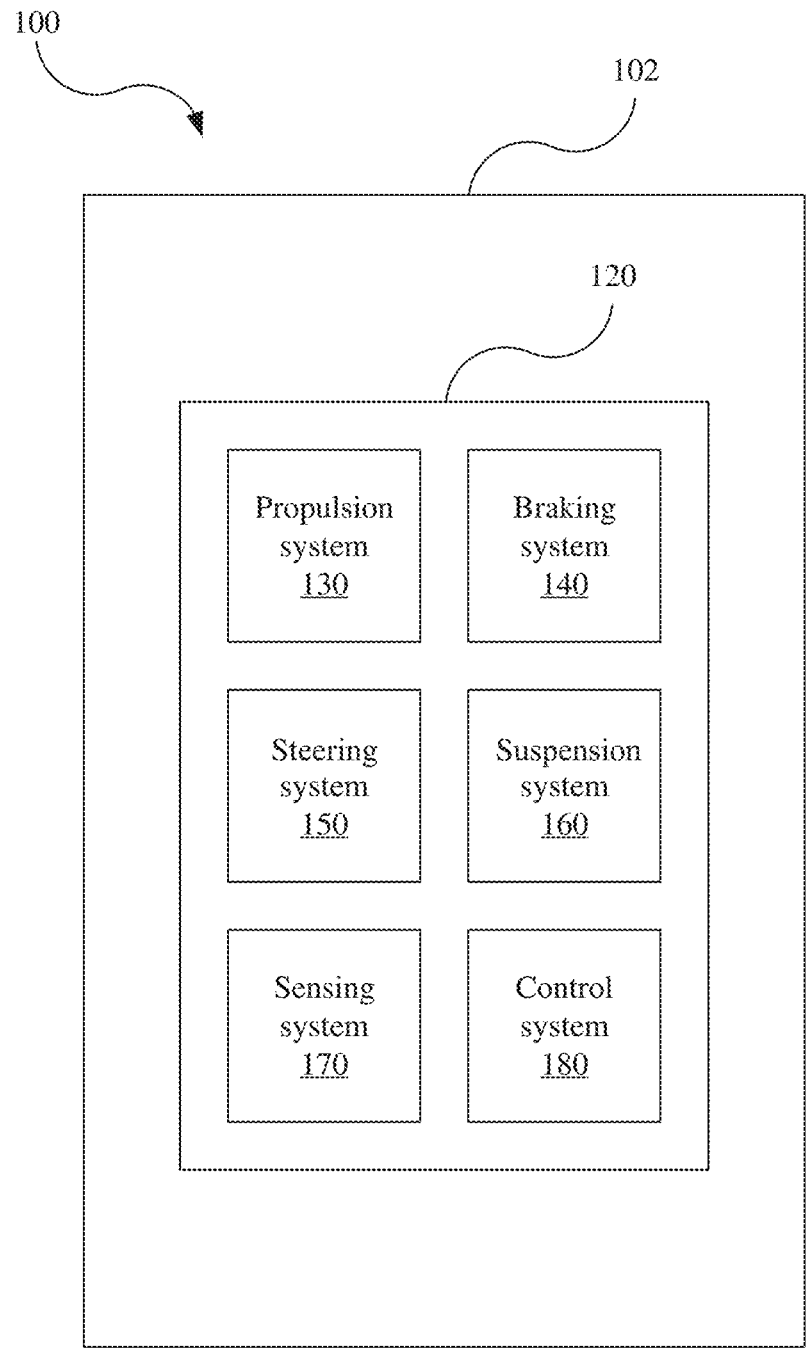
FIG. 1 is a schematic view of a vehicle according to an exemplary embodiment.

Referring to FIG. 1, the vehicle 100 generally includes a vehicle body 102 and an autonomous drive system 120 connected to the vehicle body 102. The vehicle body 102 may, for example, include or define a passenger compartment for carrying passengers. The autonomous drive system 120 is configured to move the vehicle 100, including the passenger compartment, autonomously between locations without direct human control of the various subsystems described below (e.g., a current location and a destination location specified by a user, such as one of the passengers). The autonomous drive system 120 includes various functional subsystems, including a propulsion system 130 (i.e., for propelling the vehicle 100), a friction braking system 140 (i.e., for slowing the vehicle 100), a steering system 150 (i.e., for directing the vehicle 100 in different directions), a suspension system 160 (i.e., for supporting the vehicle 100), a sensing system 170 (i.e., for sensing various aspects of the vehicle 100, including the various subsystems and the external environment), and a control system 180 (i.e., for controlling the various other subsystems individually or in a coordinated manner). The control system 180 may operate the various other subsystems, for example, by executing instructions for controlling output of the various subsystems according to related sensing (e.g., detecting roadways for driving therealong to a requested destination without further using input and detecting obstacles for avoidance thereof, for example, by accelerating, decelerating, and steering the vehicle 100). Various components, functions, and/or other aspects may be shared or integrated between these various subsystems. For example, as discussed in further detail below, deceleration may be provided cooperatively by the propulsion system 130 and the friction braking system 140, which may be considered individually or cooperatively deceleration systems of the vehicle 100.

Figure 2:
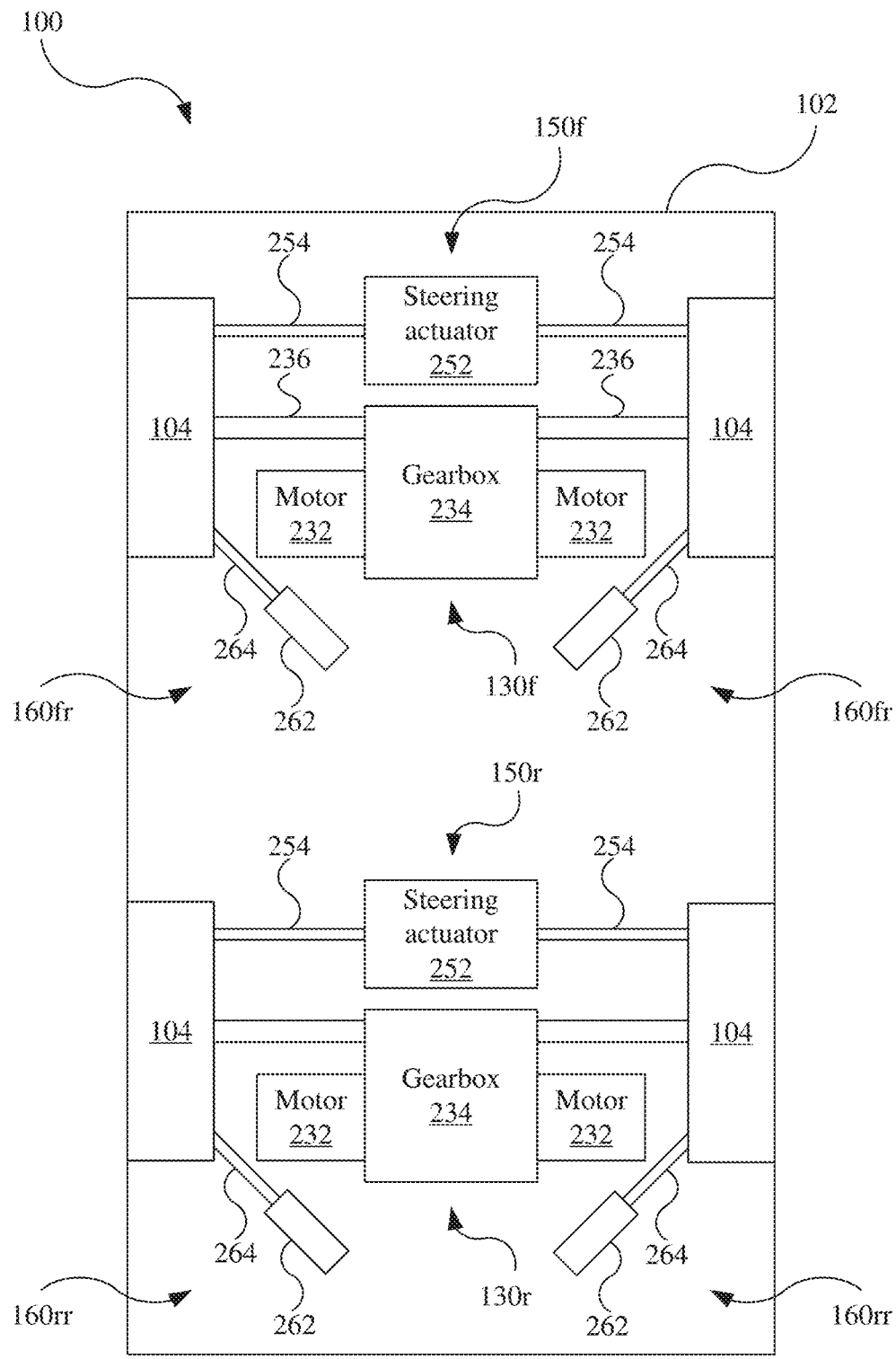
FIG. 2 is another schematic view of the vehicle of FIG. 1.

Referring to FIG. 2, the vehicle 100 includes wheels 104 (e.g., four wheels, such as two front wheels and two rear wheels) that are coupled to and support the vehicle body 102 (e.g., on a public roadway). The wheels 104 may be coupled to the vehicle body 102, for example, with the propulsion system 130, the steering system 150, and the suspension system 160. The wheels 104 may include tires (not separately shown or labeled), such that each wheel 104 may be considered a subassembly of a wheel rim and a tire.

The propulsion system 130 generally includes one or more motors 232, one or more gearboxes 234, and drive shafts 236 (e.g., half-shafts) operatively connecting each wheel 104 to one of the gearboxes 234. Broadly speaking, the motors 232 provide torque to the gearboxes 234, the gearboxes 234 alter the output torque (e.g., increase) and output speed (e.g., decrease) of the motors 232, and the drive shafts 236 transfer torque from the gearboxes 234 to the wheels 104. The motors 232 may provide positive torque for propelling the vehicle 100 in a forward direction and for decelerating the vehicle 100 when moving in a rearward direction, and may provide negative torque for propelling the vehicle 100 in a rearward direction and for decelerating the vehicle 100 when moving in a forward direction. The motors 232 may also function as generator, when receiving torque from the wheels 104, and function to recharge a battery (not shown) or other energy storage system of the vehicle 100. As shown, the propulsion system 130 may include a front propulsion system 130$f$ and a rear propulsion system 130$r$ that each include two motors 232 coupled to a single gearbox 234 and associated with one drive shaft 236 and the one wheel 104 coupled thereto. Variations of the propulsion system 130 are contemplated, which may include a different number of driven wheels 104 (e.g., only front or rear wheels being driven), a different number of motors 232 associated with the wheels 104 (e.g., one motor 232 associated with two wheels 104), and a different number of gearboxes 234 associated with the wheels 104 (e.g., one gearbox 234 dedicated for each wheel 104).

The friction braking system 140 generally provides deceleration torque via friction for decelerating the vehicle 100 when moving in the forward direction and/or when moving in the rearward direction. The friction braking system 140 may be configured according to various different considerations, including functionality with other subsystems, location within the vehicle 100 or other subsystems, and operating principles and related components, as discussed in further detail below.

The steering system 150 generally includes one or more steering actuators 252 and steering linkages 254 operatively coupling each wheel 104 to one of the steering actuators 252. Broadly speaking, the steering system 150 controls the pivoted position of the wheels 104 about generally vertical axes. The steering actuators 252 move the steering linkages 254 in inboard and outboard directions relative to the vehicle body 102 to, thereby, pivot the wheels 104 about the vertical axes. As shown, the steering system 150 may include a front steering system 150$f$ and a rear steering system 150$r$ that each include one steering actuator 252 that is associated with two steering linkages 254 and the wheels 104 coupled thereto. Variations of the steering system 150 are contemplated, which may include a different number of steering actuators 252 associated with the wheels 104 (e.g., one steering actuator 252 for each wheel 104).

The suspension system 160 generally includes a suspension actuator 262 and a suspension linkage 264 associated with each wheel 104. Broadly speaking, the suspension system 160 controls vertical motion of the wheels 104 relative to the vehicle body 102, for example, to ensure contact between the wheels 104 and a surface of the roadway and to limit the influence of roadway conditions on undesirable movements of the vehicle body 102. The suspension system 160 may, for example, be an active suspension system in which the suspension actuators 262 provide positive and negative displacement of the wheels 104 relative to the vehicle body 102 (i.e., the suspension actuators 262 may move the wheels 104 up and down relative to the vehicle body 102, as opposed merely constrain motion of the wheels 104 caused by external forces). As shown, the suspension system 160 may include a front left suspension system 160$fl$, a front right suspension system 160$fr$, a rear left suspension system 160$rl$, and a rear right suspension system 160$rr$, each of which include one suspension actuator 262 and one suspension linkage 264.

The sensing system 170 includes sensors for observing external conditions of the vehicle 100 (e.g., location of the roadway and other objects) and conditions of the vehicle 100 (e.g., acceleration and conditions of the various subsystems and their components). The sensing system 170 may include sensors of various types, including dedicated sensors and/or functional components of the various subsystems (e.g., actuators may function as sensors).

The control system 180 includes communication systems and components (i.e., for receiving sensor signals and sending control signals) and processing components (i.e., for processing the sensor signals and determining control operations), such as a controller. The control system 180 may include various control subsystems, for example, associated with (or as part of) one or more of the various other subsystems described herein (e.g., the propulsion system 130, the friction braking system 140, etc.).

Figure 16:
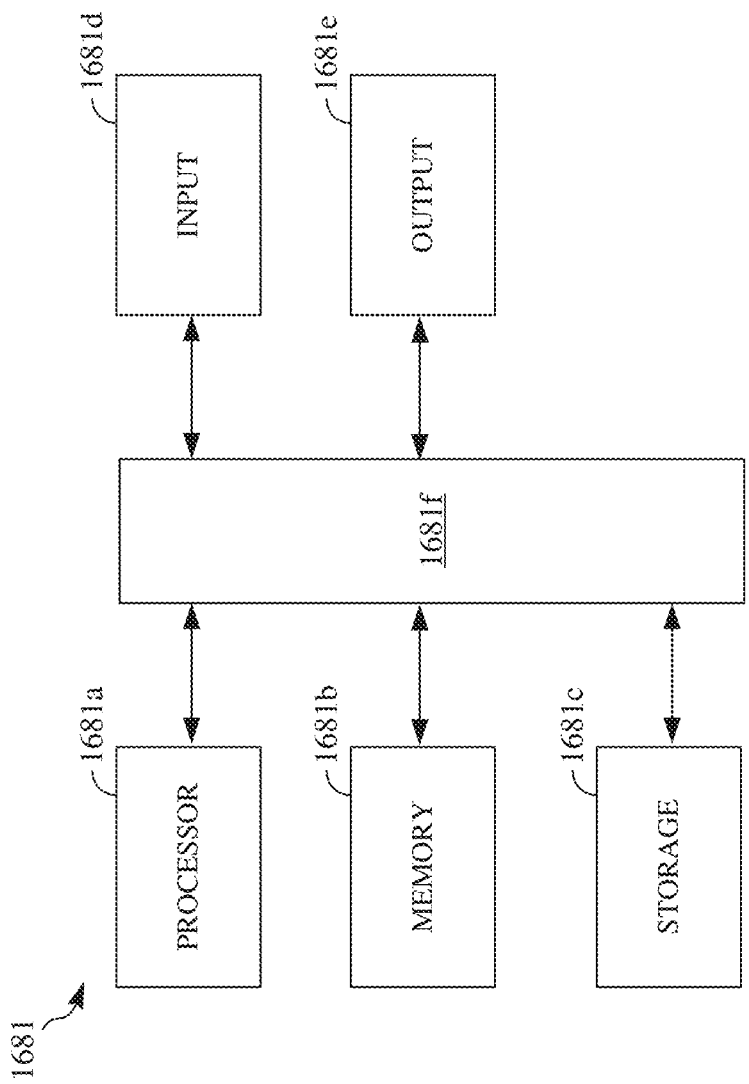
FIG. 16 is a schematic view of a controller.

Referring to FIG. 16, a hardware configuration for a controller 1681 of the control system 180 is shown, which may be used to implement the apparatuses and systems described herein (e.g., to detect an impact upon occurrence thereof and/or predict an impact in expectation thereof, and to control the movement mechanisms). As an example, the controller 1681 may output a command, such as a voltage value, to the various subsystems of the autonomous drive system 120 in response to signals received from the sensors of the sensor system 170.

The controller 1681 may include a processor 1681$a$, a memory 1681$b$, a storage device 1681$c$, one or more input devices 1681$d$, and one or more output devices 1681$e$. The controller 1681 may include a bus 1681$f$ or a similar device to interconnect the components for communication. The processor 1681$a$ is operable to execute computer program instructions and perform operations described by the computer program instructions. As an example, the processor 1681$a$ may be a conventional device such as a central processing unit. The memory 1681$b$ may be a volatile, high-speed, short-term information storage device such as a random-access memory module. The storage device 1681$c$ may be a non-volatile information storage device such as a hard drive or a solid-state drive. The input devices 1681$d$ may include any type of human-machine interface such as buttons, switches, a keyboard, a mouse, a touchscreen input device, a gestural input device, an audio input device, the sensors of the sensor system 170. The output devices 1681$e$ may include any type of device operable to provide an indication to a user regarding an operating state, such as a display screen or an audio output, or any other functional output or control, such as the propulsion system 130, the friction braking system 140, the steering system 150, and/or the suspension system 160.

As referenced above, the friction braking system 140 may work in conjunction with other subsystems of the autonomous drive system 120 and, in particular, the propulsion system 130 to decelerate the vehicle 100. More particularly, the propulsion system 130 is configured to decelerate the vehicle 100 in nearly all conditions, while the friction braking system 140 is actuated in limited (i.e., infrequent) circumstances to supplement the propulsion system 130 to decelerate the vehicle 100. For example, the friction braking system 140 may be actuated in high deceleration scenarios (e.g., avoiding errant movement of an object into the roadway, such as an animal, a pedestrian, or cargo dropped from another vehicle) and/or to act redundantly to the propulsion system 130 (e.g., if having reduced deceleration capacity). As will be discussed in further detail below, the propulsion system 130 and the friction braking system 140 may be configured to control deceleration (e.g., deceleration torque) of each wheel 104 individually.

Figure 3:
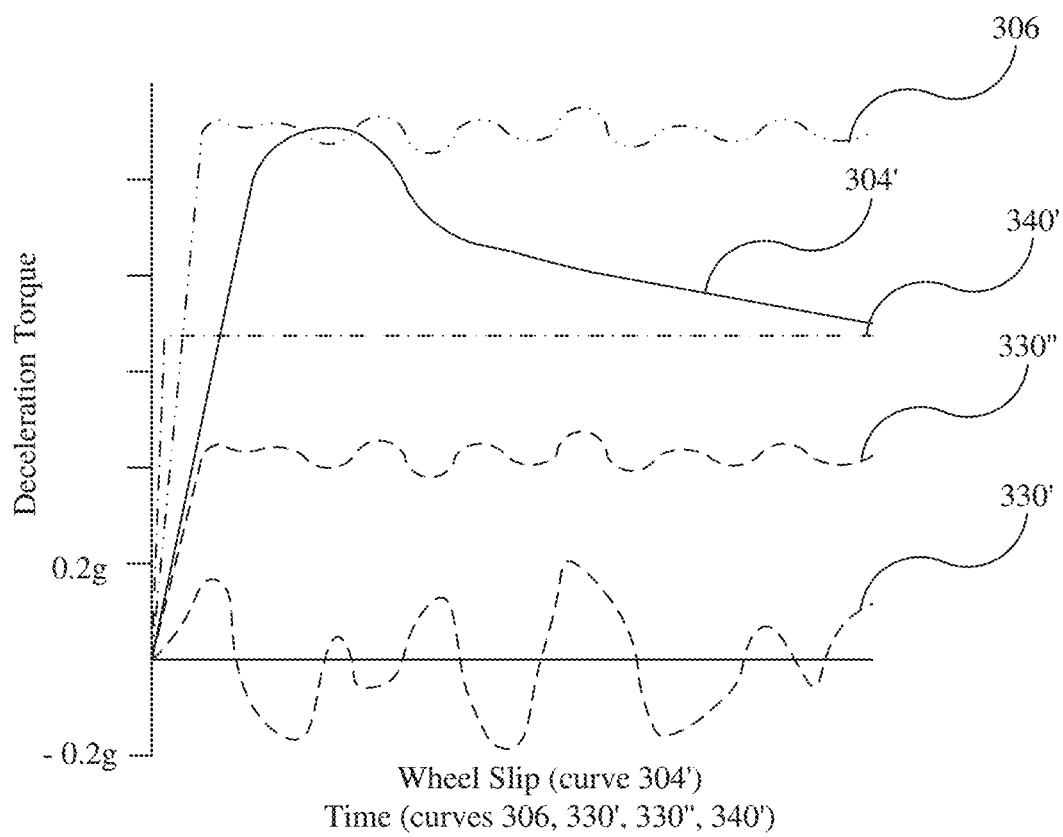
FIG. 3 is a plot of a wheel slip curve and wheel deceleration torque vs. time provided by embodiments of a propulsion system and a friction braking system of the vehicle of FIG. 1.

Referring to FIG. 3, in high deceleration scenarios, deceleration is limited by friction between the wheel 104 and the roadway. FIG. 3 depicts a slip curve 304' of deceleration (e.g., shown as deceleration torque) vs. slip for a single wheel 104, and further depicts the deceleration (e.g., deceleration) provided by the propulsion system 130 and the friction braking system 140 over time and in various conditions.

During normal conditions (e.g., low deceleration events), deceleration torque of the propulsion system 130 (depicted as curve 330') may provide deceleration torque in a range equivalent to approximately +/−0.2 g. Note that FIG. 3 depict deceleration torque as positive, thus forward acceleration torque appears as negative.

During a high deceleration event, the propulsion system 130 may provide higher deceleration torque (depicted as curve 330"), while the friction braking system 140 provides supplemental deceleration torque (depicted as curve 340'). The cumulative deceleration torque (depicted as curve 306) is the sum of the deceleration torque provided by the propulsion system 130 (i.e., curve 330") and the friction braking system 140 (i.e., curve 340').

Figure 4:
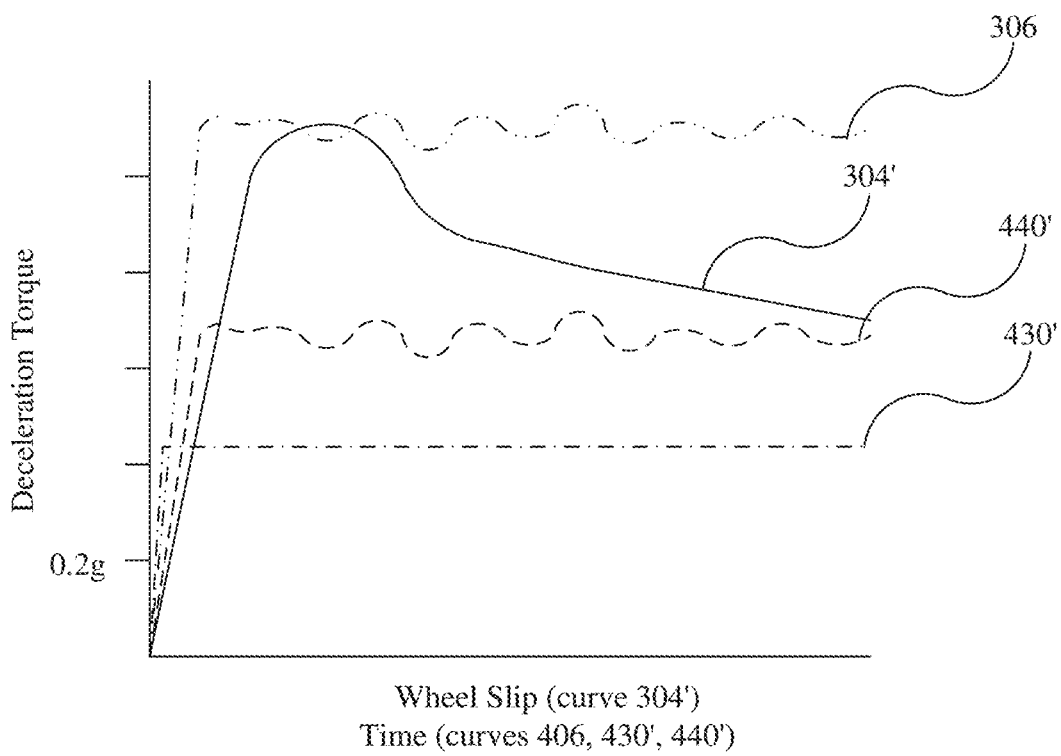
FIG. 4 is a plot of a wheel slip curve and wheel deceleration torque vs. time provided by further embodiments of a propulsion system and a friction braking system of the vehicle of FIG. 1.

The deceleration torque of the propulsion system 130 and the friction braking system 140 may be controlled to maintain maximum deceleration (i.e., the peak of the slip curve 304'). In the implementation shown in FIG. 3, the friction braking system 140 is configured to maintain a substantially constant level of deceleration torque during the high deceleration event, while the propulsion system 130 is additionally configured to modulate (i.e., vary) the deceleration torque provided thereby, so as to maintain the amplitude of the cumulative braking deceleration torque (i.e., curve 306) near the peak achievable deceleration torque of the wheel 104 (i.e., the peak of the slip curve 304'). Alternatively, as shown in FIG. 4, the propulsion system 130 may be configured to maintain a substantially constant level of deceleration torque (depicted by curve 430'), while the friction brake system 140 is configured to modulate the deceleration torque (depicted by curve 440') provided thereby, so as to maintain the amplitude of the cumulative braking deceleration torque (i.e., curve 306). In each of the scenarios described in FIGS. 3 and 4, the control system 180 is configured to control the propulsion system 130 and the friction braking system 140, which cooperatively form a deceleration system, to output the torque from the propulsion system 130 (e.g., one of the motor-generators described below) and the braking system 140 (e.g., the inboard friction brakes as described below) to apply torque to the wheels to achieve the required (e.g., peak available) deceleration torque. For example, the control system 180 may receive, as inputs, torque measurements from the sensors 130 for the wheels, axles, motor-generators, and/or friction brakes.

Figure 5:
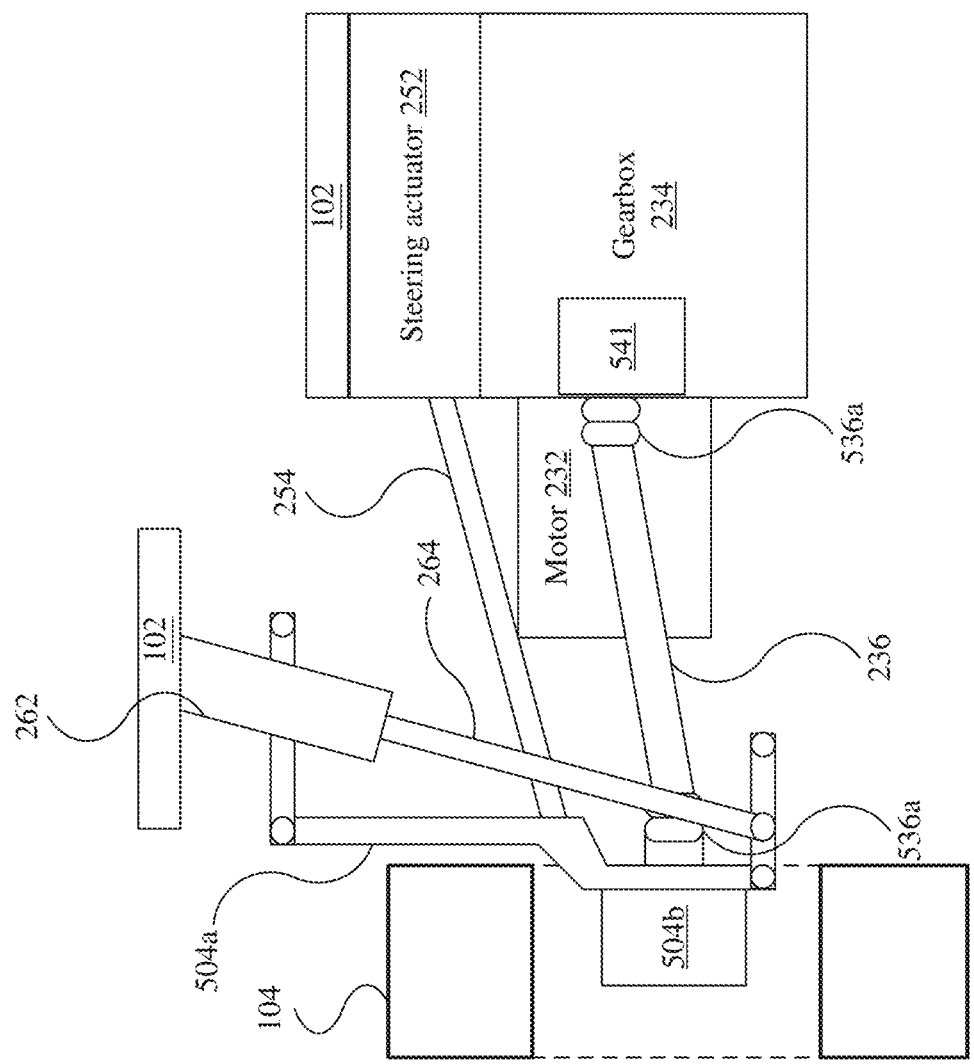
FIG. 5 is a schematic view of a portion of the vehicle of FIG. 1.

Friction brake mechanisms 541 of the friction braking system 140 may be arranged at various locations. As shown in FIG. 5, which depicts the portions of the propulsion system 130, the friction braking system 140, the steering system 150, and the suspension system 160 for one corner of the vehicle 100 (e.g., a front left corner), the friction brake mechanism 541 may be arranged at an inboard location relative to the wheel 104, components of the propulsion system 130, components of the steering system 150, and/or components of the suspension system 160.

The wheel 104 is functionally and structurally supported by the steering system 150 and the suspension system 160. The wheel 104 may be coupled to a knuckle 504a, which rotatably supports the wheel 104 with a bearing 504b. The knuckle 504a is in turn pivotally supported and/or controlled by the steering system 150 and vertically supported and/or controlled by the suspension system 160. The steering linkage 254 is coupled to the knuckle 504a, while the steering actuator 252 is coupled to the vehicle body 102 to pivotally support and control pivotal motion of the wheel 104 relative to the vehicle body 102. Similarly, the suspension linkage 264 is pivotally coupled to the knuckle 504a (or intermediate member), while the suspension actuator 262 is in turn coupled to the vehicle body 102 to support and control vertical motion of the wheel 104 relative to the vehicle body 102.

The wheel 104 is additionally coupled to the propulsion system 130. More particularly, constant velocity joints 536a (e.g., CV joints) are arranged between the wheel 104 and the drive shaft 236 and between the drive shaft 236 and the gearbox 234. The constant velocity joints 536a allow the propulsion system to transfer torque to the wheel 104 as the position and orientation of the wheel 104 changes relative to the gearbox 234.

The friction brake mechanisms 541 of the friction brake system 140 are arranged inboard of the wheel 104 (i.e., toward a center of the vehicle 100), further inboard of the outboard constant velocity joint 536a (i.e., that between the wheel 104 and the drive shaft 236), and still further inboard of the inboard constant velocity joint 536a (i.e., that between the drive shaft 236 and the gearbox 234). By arranging the friction brake mechanisms 541 at inboard locations, unsprung mass may be reduced and space in or near the wheel 104 may be freed for other uses, as compared to human-operated vehicles with conventional friction brakes located in the wheel. The friction brake mechanisms 541 at inboard locations may be particularly advantageous with the active suspension system having the suspension actuators 262, which provide positive and negative displacement of the wheels 104 relative to the vehicle body 102, by reducing the unsprung mass that the suspension actuators 262 may move up and down with the wheels 104 up and down relative to the vehicle body 102. The friction brake mechanisms described herein (e.g., 541) that are located at inboard locations (e.g., inboard of the constant velocity joint and/or not forming unsprung mass) may be referred to as inboard friction brakes.

Thus, in various embodiments, the vehicle 100 includes friction brake mechanisms 541 of a friction brake system 140, which are arranged at locations inboard of the constant velocity joints 536a connecting the wheels 104 to the gearbox 234. The vehicle 100 may additionally include no friction brake mechanisms at locations outboard of the constant velocity joints 536a (e.g., proximate or surrounded by wheels 104) for one or more (e.g., all) of the wheels 104. The vehicle 100 may also include friction brake mechanisms 541 that do not form unsprung mass, and may further include no friction brake mechanisms that form unsprung mass. In each variation, the vehicle 100 may include an active suspension mechanism (e.g., suspension actuator 262 and suspension linkage 264) associated with each wheel 104 for which friction brake mechanisms 541 are arranged at an inboard location and/or are not arranged at an outboard location.

As discussed in further detail below, the friction brake mechanisms 541 may be arranged at inboard locations associated with various components of the propulsion system 130, including various components of the motor 232 and the gearbox 234.

Figure 6:
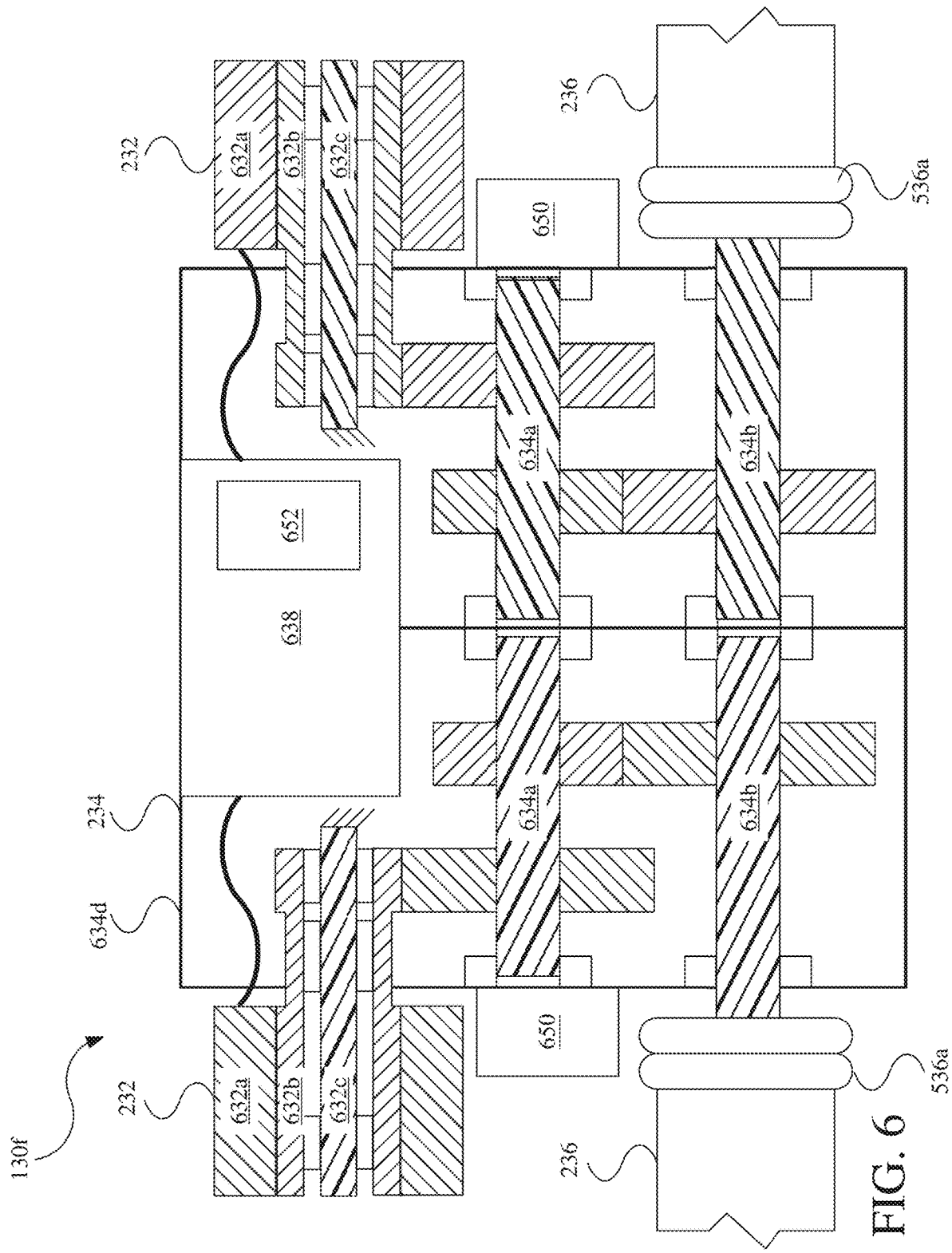
FIG. 6 is a partial cross-sectional view of an embodiment of a propulsion system of the vehicle of FIG. 1.

Referring to FIG. 6, which is a partial cross-sectional view, the front propulsion system 130f includes two of the motors 232, one gearbox 234 with two functional halves, and two of the drive shafts 236 coupled to the gearbox 234. The rear propulsion system 130r may be configured similar to that shown and described for the front propulsion system 130f. Further, as noted above, the propulsion system 130, including the front propulsion system 130f and the rear propulsion system 130r, may be configured in different manners (e.g., by having one gearbox associated with each wheel, having one motor drive two wheels, etc.).

Each of the motors 232 is a motor-generator that draws current from an electric power source (e.g., a battery 638) to produce an output torque and may produce current when receiving an input torque (e.g., to recharge the power source). Each motor 232 generally includes a stator 632a and a rotor assembly 632b. The motor 232 may be coupled to the gearbox 234 with the stator 632a being stationary relative thereto and the rotor assembly 632b rotatable relative thereto. For example, the gearbox 234 may include a bearing shaft 632c that is fixed to (e.g., grounded) to the gearbox 234 and protrudes therefrom, and which is received within the rotor assembly 632b. Bearings may be arranged between the bearing shaft 632c and the rotor assembly 632b.

Each half of the gearbox 234 is associated with one of the drive shafts 236 and is configured to transfer torque between the motor 232 and the drive shaft 236 and may also change the torque and rotational speed between the motor 232 and the drive shaft 236. Each functional half of the gearbox 234 generally includes an intermediate shaft assembly 634a and an output shaft assembly 634b, which may be supported by bearings (not labeled) of a housing 634c of the gearbox 234. The intermediate shaft assembly 634a transfers torque between the motor 232 and the output shaft assembly 634b, which in turn transfers torque between the intermediate shaft assembly 634a and the drive shaft 236. Torque is transferred between the rotor assembly 632b, the intermediate shaft assembly 634a, and the output shaft assembly 634b via gears (shown; not labeled) that engage each other and may change the torque and speed between the motor 232 and the drive shaft 236, as referenced above. The drive shaft 236 may be coupled to the output shaft assembly 634b with the constant velocity joint 536a (e.g., CV joint) that allows the drive shaft 236 to pivot off-axis from the output shaft assembly 634b, while still transferring torque therebetween. The gearbox 234 may be configured in various other manners, for example, including a different number of intermediate shaft assemblies and/or by transferring torque from one motor 232 to two drive shafts 236.

As is also illustrated in FIG. 6, the propulsion system 130 may also include supplemental motor-generators 650, such as one supplemental motor-generator 650 for each of the motor-generators 232 (e.g., referred to as primary motor-generators). The supplemental motor-generators 650 selectively transfer torque to the driven wheels 104 to provide additional torque for acceleration or deceleration of the vehicle 100. For example, during high deceleration events, such as when require deceleration torque exceeds a torque capacity of the primary motor-generators 232, as may be limited by the mechanical and/or electrical properties thereof or of the power source 638 associated therewith, the supplemental motor-generator 650 may provide supplemental torque to help achieve the required deceleration torque and assist decelerating the vehicle 100. The supplemental motor-generator 650 may be associated with the same power source as the primary motor-generator 232 (e.g., the power source 638) or another power source/storage (e.g., 652). The supplemental motor-generator 650 may be coupled to the gearbox 234 (e.g., permanently) to which the primary motor-generator 232 transfers torque. For example, the supplemental motor-generator 650 may be engaged with the intermediate shaft 634a thereof (e.g., engaging the same gear as the primary motor-generator 232 at a different circumferential location). The supplemental motor-generator 650 is selectively operated (e.g., by the control system 180) to selectively transfer the supplemental torque to the driven wheels 104 via the gearbox 234 to thereby supplement the torque (e.g., drive torque) provided by the primary motor-generator 232.

Referring to FIGS. 7-11, the friction braking system 140 includes various friction brake mechanisms that are positioned inboard relative to the wheels 104, for example, being coupled to or incorporated into the propulsion system 130 in various manners. The friction braking system 140 may include one friction brake mechanism for each wheel 104.

As described above, the propulsion system 130 provides adequate deceleration torque in nearly all circumstances, such that the friction braking system 140 may be infrequently used. As such, consequences normally associated with friction brakes (e.g., wear, debris, replacement, and heat) in human-operated vehicles may have limited effect when incorporating the friction braking system 140 into or proximate the gearboxes 234 of the propulsion system 130. Moreover, autonomous control may prevent operation of the vehicle 100 in manners that might otherwise consequential operation of the friction braking system 140 (e.g., preventing usage scenarios in which high deceleration events might occur in close time proximity to each other or based on temperature, such as by operating at lower speeds and/or preventing movement of the vehicle 100).

Figure 7:
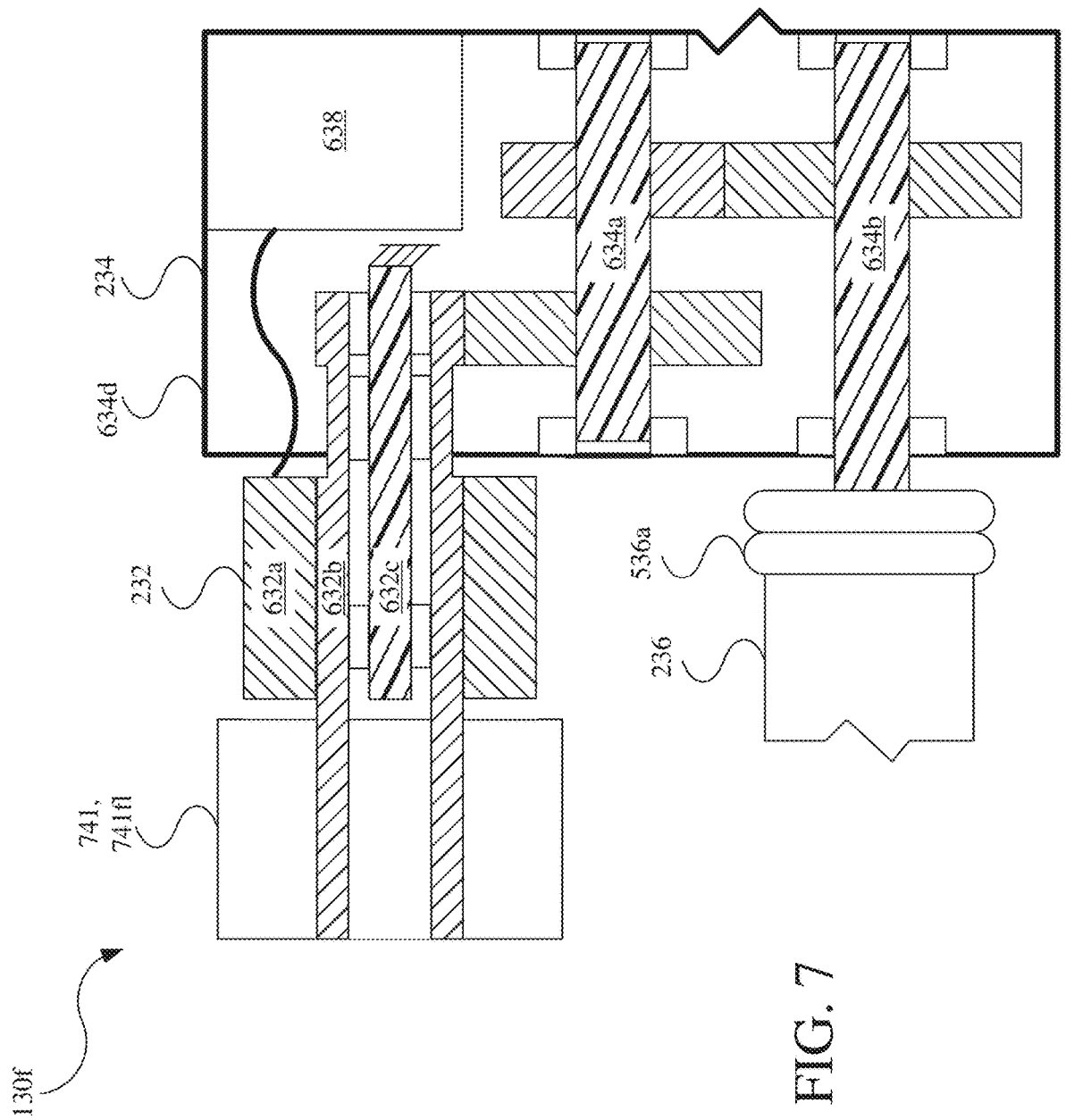
FIG. 7 is a partial cross-sectional view of another embodiment of the propulsion system and an embodiment of a friction braking system of the vehicle of FIG. 1.

Referring specifically to FIG. 7, which depicts the front left half of the front propulsion system 130', the friction braking system 140 includes friction brake mechanisms 741 (e.g., a front left friction brake mechanism 741fl) that provide deceleration torque to one of the wheels (e.g., a front left wheel). The friction brake mechanism 741 is operationally coupled to a back side of the motor 232 (i.e., opposite the side transferring torque to/from the gearbox 234), for example, to the rotor assembly 632b (as shown). The friction brake mechanisms 741 are arranged external to the gearbox 234 but may be coupled thereto and/or contained in a distinct housing therefrom.

Figure 8:
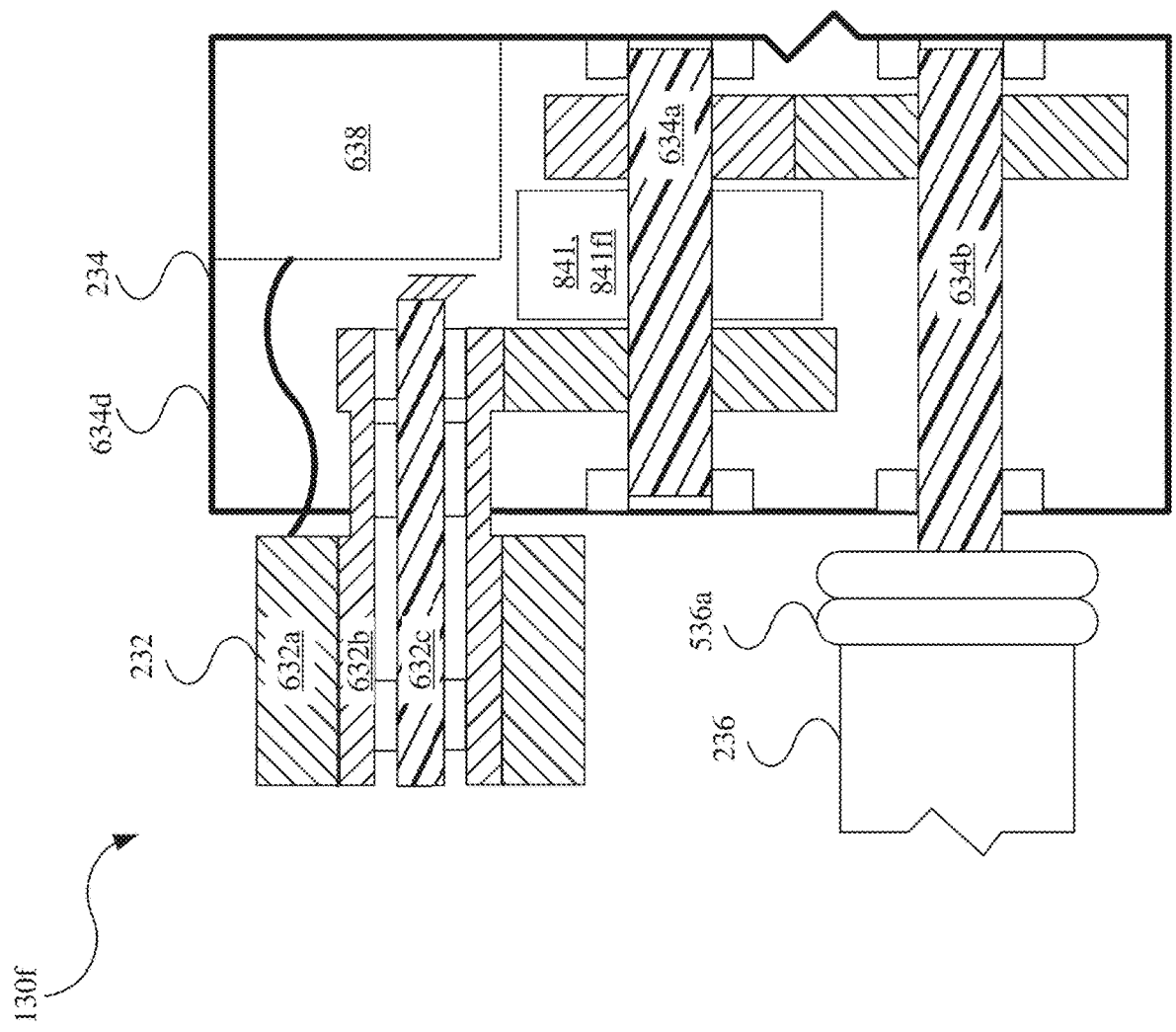
FIG. 8 is a partial cross-sectional view of another embodiment of the propulsion system and another embodiment of a friction braking system of the vehicle of FIG. 1.

Referring to FIG. 8, the friction braking system 140 includes friction brake mechanisms 841 (e.g., a front left friction brake mechanism 841fl) that provide deceleration torque to one of the wheels (e.g., a front left wheel). The friction brake mechanism 841 is operationally coupled to the intermediate shaft assembly 634a (e.g., to the shaft thereof). The friction brake mechanisms 841 are arranged internal to the gearbox 234.

Figure 9:
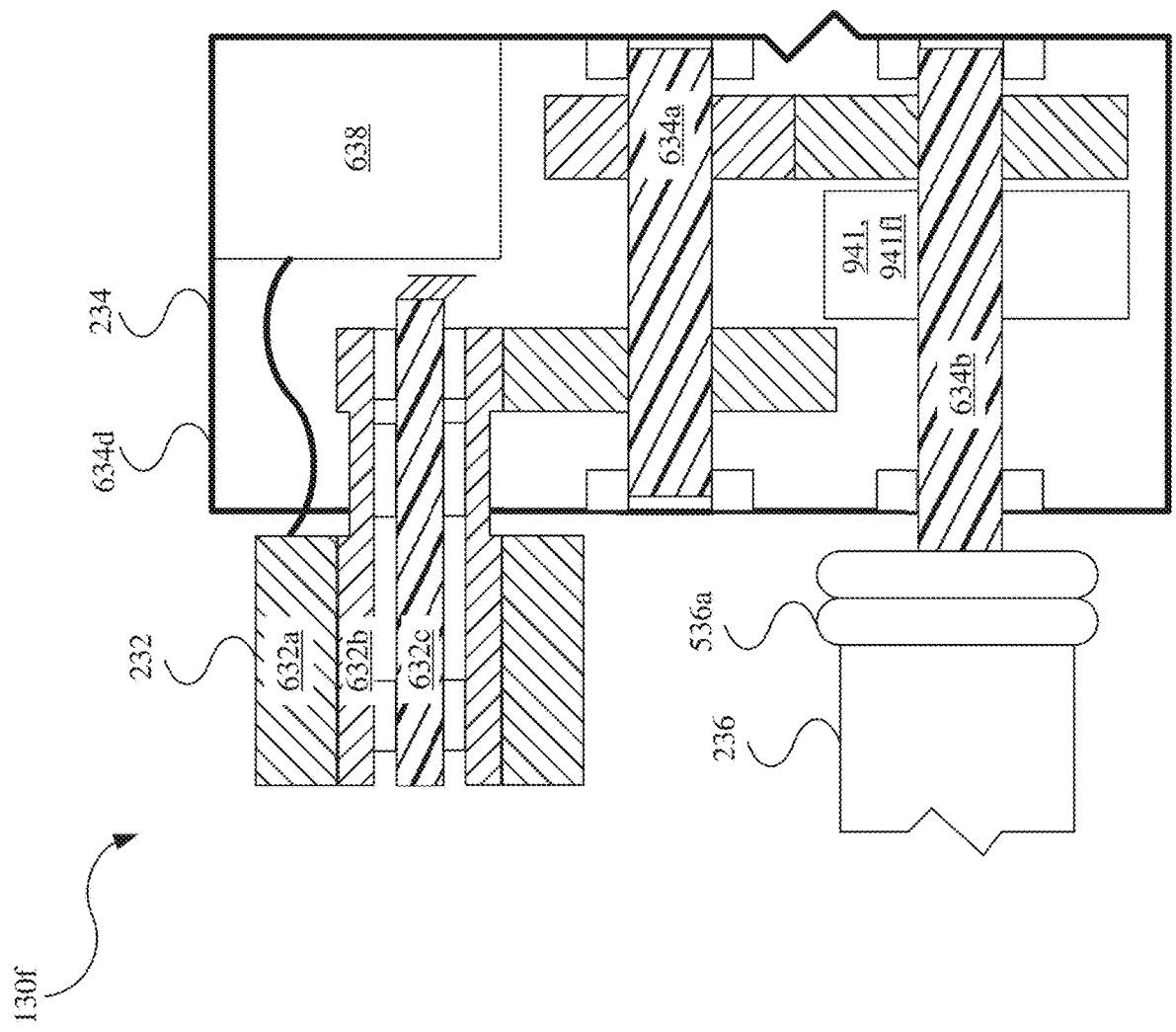
FIG. 9 is a partial cross-sectional view of another embodiment of the propulsion system and another embodiment of a friction braking system of the vehicle of FIG. 1.
Figure 10:
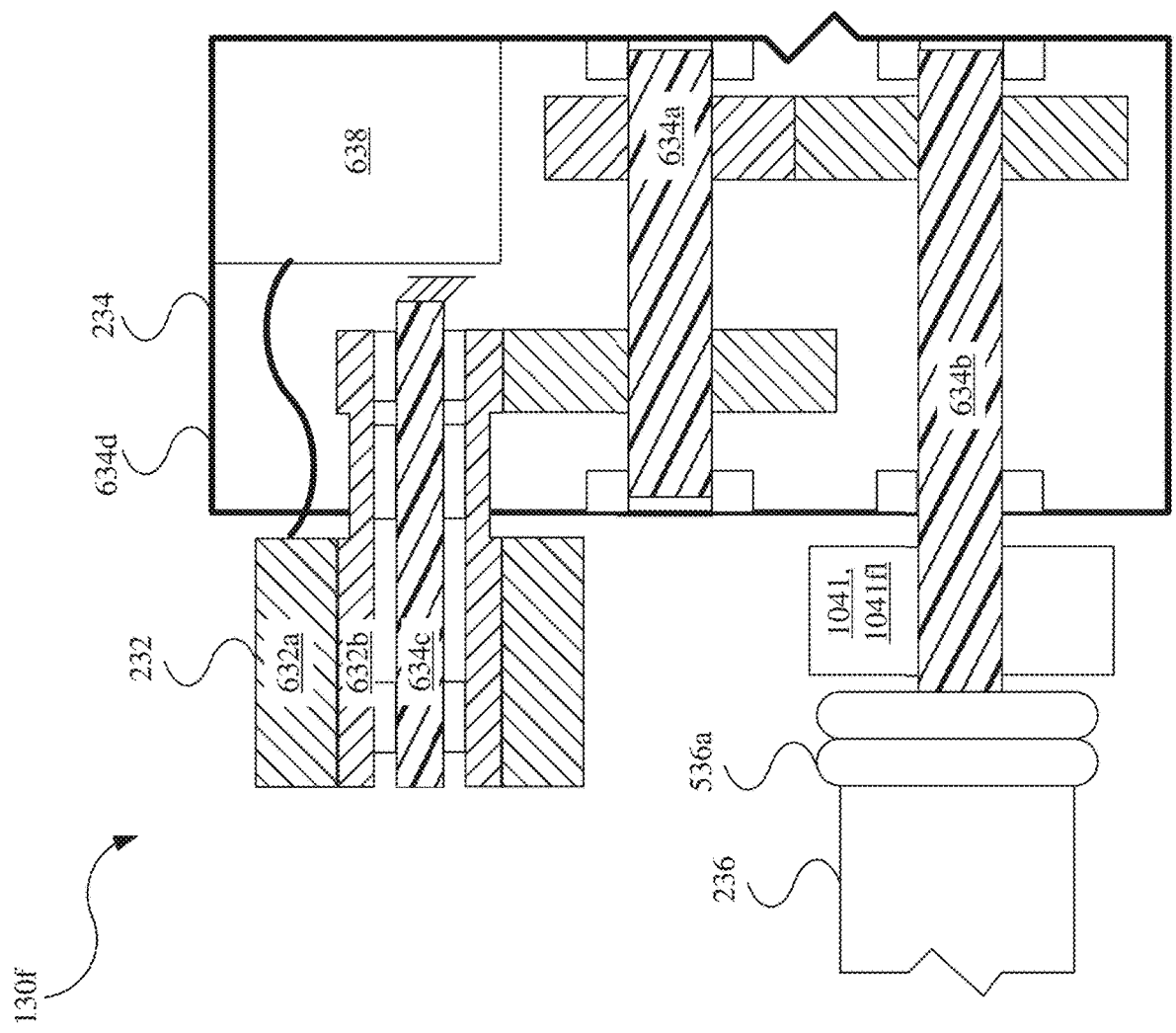
FIG. 10 is a partial cross-sectional view of another embodiment of the propulsion system and another embodiment of a friction braking system of the vehicle of FIG. 1.

Referring to FIG. 9, the friction braking system 140 includes friction brake mechanisms 941 (e.g., a front left friction brake mechanism 941fl) that provide deceleration torque to one of the wheels (e.g., a front left wheel). The friction brake mechanisms 941 are operationally coupled to the output shaft assembly 634b (e.g., to the shaft thereof) of the gearbox 234. The friction brake mechanisms 941 are arranged internal to the gearbox 234. Alternatively, as shown in FIG. 10 the friction braking system 140 may include friction brake mechanisms 1041 (e.g., friction brake mechanism 1041fl) that are also operationally coupled to the output shaft assembly 634b, but arranged external to the gearbox 234, for example, between the housing 634c and the constant velocity joint 536a. The friction brake mechanism 1041 may, for example, be incorporated in a separate housing that is coupled to the housing 634c of the gearbox 234.

Figure 11:
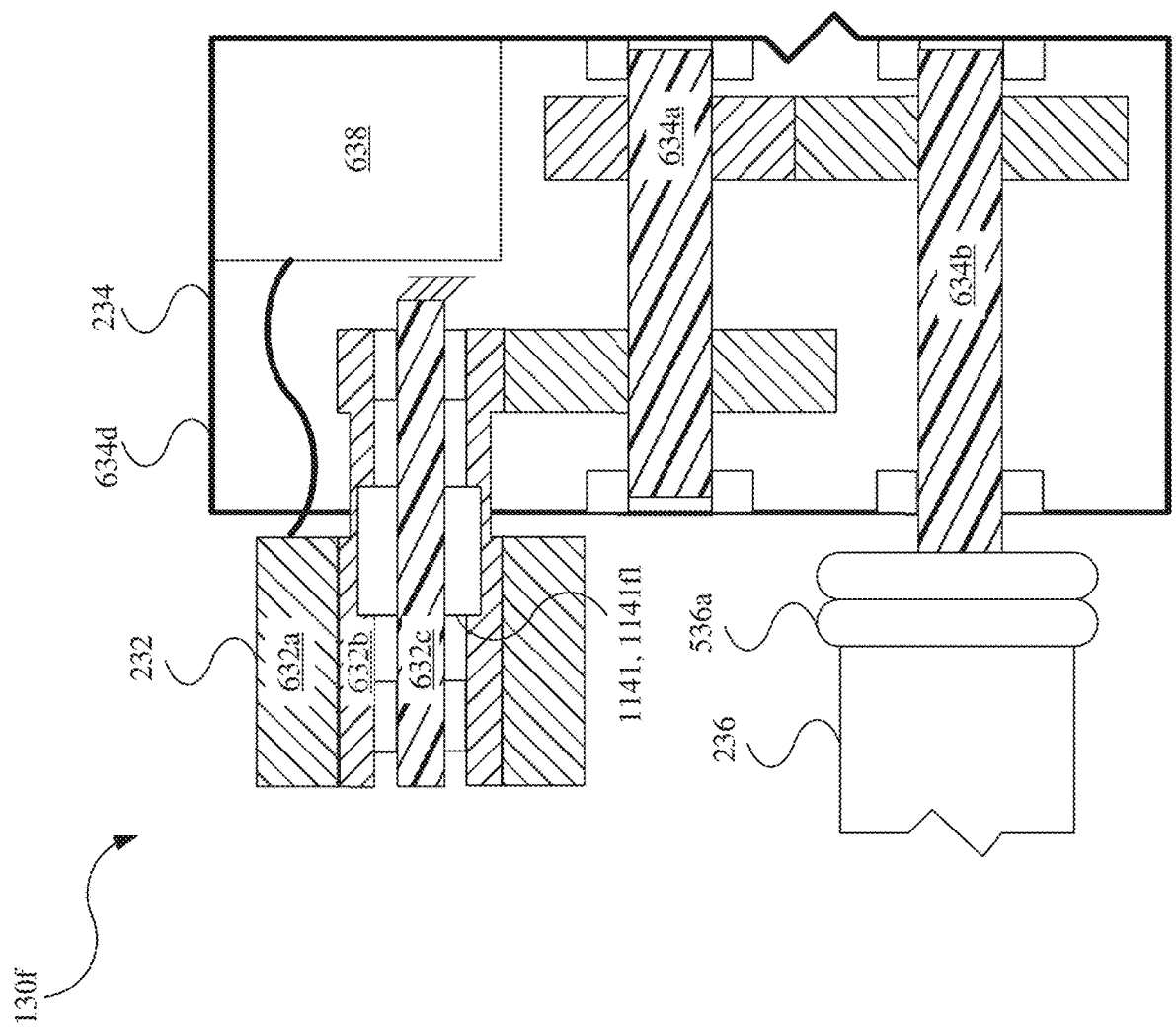
FIG. 11 is a partial cross-sectional view of another embodiment of the propulsion system and another embodiment of a friction braking system of the vehicle of FIG. 1.

Referring to FIG. 11, the friction braking system 140 may include friction brake mechanisms 1141 that are incorporated into the motors 232 (e.g., a front left friction brake mechanism 1141*fl*) and provide deceleration torque to one of the wheels (e.g., a front left wheel). The friction brake mechanisms 1141 are operationally coupled to the rotor assembly 632*b* and the bearing shaft 632*c* that is grounded to the gearbox 234 (or to another portion of the gearbox 234). The friction brake mechanisms 1141 are arranged internal to the motor 232 (e.g., within a housing thereof) radially inward of both the stator 632*a* and the rotor assembly 632*b*. This arrangement may be advantageous for packaging purposes to limit the combined lateral size (i.e., inboard-outboard direction) of the motors 232 and the gearbox 234.

It should be noted that, while the various different friction brake mechanisms 741, 841, 941, 1041, 1141 were discussed in the context of a front propulsion system 130*f* having two motors 232 (i.e., one for each wheel 104) and one gearbox 234 with two halves, the friction brake mechanisms may be incorporated in similar manners (e.g., locations) in propulsion systems 130 having different configurations. For example, in propulsion systems having one motor and one gearbox associated with two wheels, the friction braking system may include friction brake mechanisms operationally coupled to a back side of the motor (as with friction brake mechanism 741), operationally coupled to an intermediate shaft (as with friction brake mechanism 841), or be provided within a motor (as with friction brake mechanism 1141) and provide deceleration torque for the two wheels cooperatively. Friction brake mechanisms may also be operationally coupled to an output shaft assembly associated with each wheel inside or outside the gearbox (as with friction brake mechanisms 941 and 1041) to provide deceleration torque for the two wheels 104 individually.

Each of the different friction brake mechanisms 741, 841, 941, 1041, 1141 may be any one of the specific friction brake mechanisms discussed in below, including friction brake mechanism 1241 (e.g., a momentum brake mechanism), friction brake mechanism 1341 (e.g., a drum brake mechanism), friction brake mechanism 1441, or another type of brake mechanism (e.g., having a brake caliper and rotor).

Figure 12A:
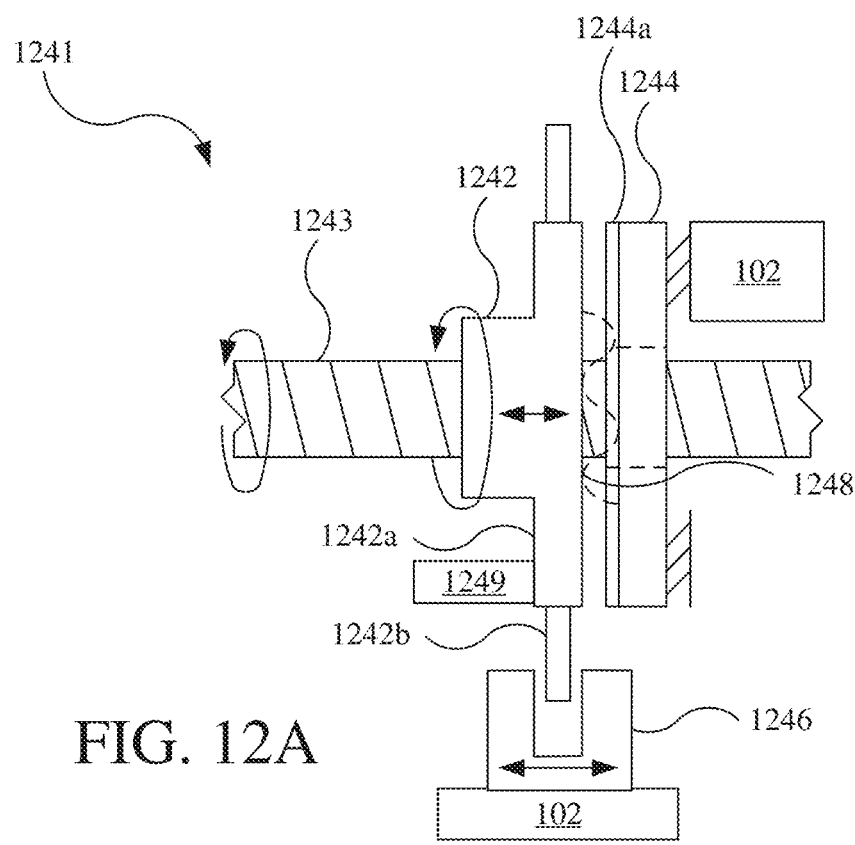
FIG. 12A is a partial side view of a friction brake mechanism of any of the friction braking systems of FIGS. 7-10, which is in a first state.
Figure 12B:
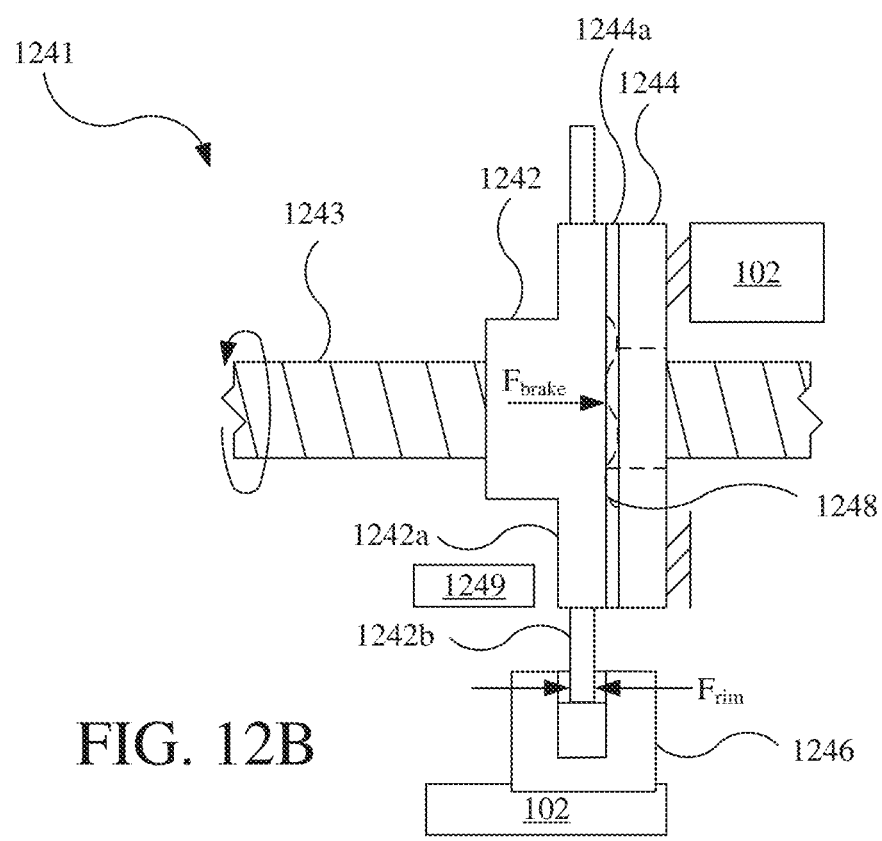
FIG. 12B is a partial side view of the friction brake mechanism of FIG. 12A in a second state.

Referring to FIGS. 12A-12B, the friction braking system 140 includes one or more friction brake mechanisms 1241. The friction brake mechanism 1241 is a momentum brake, which uses inertia of the vehicle 100, as transmitted through various shafts of the propulsion system 130, to generate clamping or braking force.

The friction brake mechanism 1241 generally includes a rotor 1242 (e.g., screw nut), a friction body 1244, and a clamping device 1246.

The rotor 1242 generally includes a central portion 1242*a* (e.g., body) and an outer portion 1242*b* (e.g., rim, radially-extending, flange, or disc portion) extending radially outward from the central portion 1242*a*. The rotor 1242 is threadably engaged to a shaft corresponding to one of the locations of the friction brake mechanisms discussed above (e.g., to the rotor assembly 632*b* with either of the friction brake mechanism 741, 1141; to the intermediate shaft assembly 634*a* with the friction brake mechanism 841; to the output shaft assembly 634*b* with either of the friction brake mechanisms 941, 1041). Hereinafter with reference to the friction brake mechanism 1241, the shaft is identified as the shaft 1243, but should be understood to be any of the rotor assembly 632*b*, the intermediate shaft assembly 634*a*, or the output shaft assembly 634*b*.

The threaded engagement between the rotor 1242 and the shaft 1243 may, for example, be direct engagement between the rotor 1242 and the shaft 1243 as with a lead screw or with intervening rolling members as with a ball screw. As an alternative to threaded engagement, the rotor 1242 may function as a barrel cam having internal tapered slots in which are received rollers that are circumferentially fixed to the shaft 1243 (i.e., such that relative rotation causes the rollers to act on the tapered slot to bias the barrel cam and, thereby, the rotor 1242). In a still further alternative, the rotor 1242 may function as a ball ramp or face cam in which case an annular member (e.g., flange) is rotationally fixed to the shaft 1243 and axially engages a complementary annular member coupled to (or formed by) the rotor 1242. The annular members have tapered (e.g., ramped surfaces) that engage each other (or via intervening rolling members or balls), such that relative rotation biases the annular member of the rotor 1242.

While the threads are depicted as having a constant taper over the shaft 1243, the threads may have varying tapers and/or be confined to the axial region of the shaft 1243 in which the rotor 1242 moves. Furthermore, the taper may vary in different manners, for example, by reducing in angle (i.e., for quick initial movement of the rotor 1242 and subsequent slower movement with higher force) or increasing in angle (i.e., for high initial force and subsequent reduced force). Varying tapers may also be used with the barrel cam and face cam configuration described above.

The friction body 1244 includes a friction material 1244*a* that faces the central portion 1242*a* of the rotor 1242 with an axial face shaped in a complementary manner (e.g., planar, as shown, or cone shaped, corrugated) to engage the central portion 1242*a* of the rotor 1242, which functions as a friction surface of the rotor 1242. The friction body 1244 is grounded (rotationally fixed) to the vehicle body 102 (e.g., through the housing 634*c* of the gearbox 234). The shaft passes through the friction body 1244 (inner periphery indicated by dashed lines) or clearance is otherwise provided therebetween to allow the shaft 1243 to rotate and the friction body 1244 be stationary. As an alternative to the rotor 1242 and the friction body 1244 directly engaging each other, a series of interleaved friction plates with appropriate friction material are alternatingly splined to the shaft 1243 and to ground (e.g., a clutch pack) and arranged axially between the rotor 1242, which acts as an apply or compression plate to compress the interleaved friction plates.

The clamping device 1246 (e.g., caliper or rim brake) is configured to selectively clamp the outer portion 1242*b* of the rotor 1242 to slow rotation thereof. The clamping device 1246 is grounded to the vehicle body 102 (e.g., through the gearbox 234) to be rotationally fixed relative thereto. The clamping device 1246 is additionally configured to slide axially parallel with the shaft 1243 on which the rotor 1242 is threaded, for example, being mounted via an appropriate sliding bearing. The clamping device 1246 may, for example, be a caliper, such as an electro-mechanical caliper (e.g., actuated with a motor and ball screw or lead screw) or a hydraulically-actuated caliper (e.g., having master cylinder in fluidic communication with the clamping device 1246 and itself actuated by a motor-generator).

As an alternative to a caliper or other physical clamping device for slowing rotation of the rotor 1242, the friction brake mechanism 1241 may instead incorporate an eddy current brake. The rotor 1242 includes brake fins (e.g., made of a conductive material, such as copper or aluminum), while coils are selective energized to produce a magnetic field that passes through the brake fins. Resultant eddy currents generate a torque opposed to rotation of the rotor 1242 (i.e., causing screw leads of the shaft 1243 to force the rotor 1242 toward the friction body 1244) and also dissipate energy. As a further alternative to a caliper or other physical clamping device for slowing rotation of the rotor 1242, the friction brake mechanism 1241 may instead include linear actuator (e.g., motor and ball screw or lead screw) that presses axially on the outer portion 1242*b* of the rotor 1242 thereby creating friction therebetween (i.e., to slow rotation of the shaft 1243) and also biasing the rotor 1242 toward the friction body 1244.

During normal operation (see FIG. 12A), the rotor 1242 is biased away from the friction body 1244 and rotates with the shaft 1243 that it is threaded on. For example, a spring 1248 (e.g., a wave or Belleville washer) may be interposed between the rotor 1242 and the friction body 1244 to bias the rotor 1242 away from the friction body 1244. Axial movement of the rotor 1242 may, for example, be limited by an axial stop 1249 against which the rotor 1242 is pressed. Suitable bearings (not shown) may be arranged between rotating and grounded components to reduce friction and prevent wear.

During a high deceleration event (see FIG. 12B), the clamping device 1246 clamps the outer portion 1242*b* of the rotor 1242 to stop rotation thereof relative to the vehicle body 102. As the shaft 1243 continues to rotate relative to the vehicle body 102 (e.g., from inertia of the vehicle 100 transferred through the wheel 104 and various components of the propulsion system 130 to the shaft 1243) and, thereby, the rotor 1242, threads of the shaft 1243 force the rotor 1242 axially toward the friction body 1244 to overcome force of the spring 1248. As a result, the central portion 1242*a* of the rotor 1242 engages the friction material 1244*a* of the friction body 1244 and, in turn, induces a deceleration torque on the shaft 1243. As the rotor 1242 moves axially on the shaft 1243, the clamping device 1246 slides axially with the rotor 1242.

The friction brake mechanism 1241 generates a lateral force $F_{brake}$ between the rotor 1242 and the friction body 1244 that multiplies clamping force $F_{clamp}$ applied by the clamping device 1246 to the rotor 1242. The lateral force $F_{brake}$ of the rotor 1242 against the friction body 1244 is equal to $2 \times pi \times T_{rim}/l$, where $T_{rim}$ equals the torque applied by the clamping device 1246 to the rotor 1242 (i.e., to the rim or outer portion 1242*b* thereof) and l equals the lead of the shaft 1243 (i.e., $F_{brake} = 2 \times pi \times T_{rim} \times l$). The rim torque $T_{rim}$ is equal to $F_{rim} \times R_{rim} \times \mu_{rim}$, where $R_{rim}$ is the radius at which the clamping force $F_{rim}$ is applied to the rotor 1242 and prim is the friction between the clamping device 1246 and the rotor 1242 (i.e., $T_{rim} = F_{rim} \times R_{rim} \times \mu_{rim}$). Thus, the lateral force $F_{brake}$ may be calculated as a function of the clamping force $F_{rim}$ with known inputs of the screw lead l, radius $R_{rim}$ at which the outer portion 1242*b* of the rotor 1242 is clamped, and the friction prim between the clamping device 1246 and the outer portion 1242*b* of the rotor 1242. Using, as an example, l (0.005), $R_{rim}$ (150 mm), and $\mu_{rim}$ (0.4) as examples, the lateral force $F_{brake}$ is 75 times the clamping force $F_{rim}$.

The friction brake mechanism 1241 may be provided as a dry application (i.e., without oil) or as a wet application (i.e., with oil), for example, within the gearbox 234 or other housing. In the wet application, the friction materials may be partially bathed in the oil (e.g., that otherwise lubricating the gearbox 234), the friction body 1244 may be configured as multiple discs (e.g., the interleaved plates as described above), and/or the friction discs may be corrugated to entrap more oil.

Additional variations of the friction brake mechanism 1241 are contemplated. In one variation, the arrangement of the rotor 1242 and the friction body 1244 are reversed in which case the rotor 1242 grounded to the vehicle body 102. The friction body 1244 is threaded on the shaft 1243 and displaced axially by the shaft 1243 when slowed by the clamping device 1246.

Referring to FIGS. 13A-13D, the friction braking system 140 includes one or more friction brake mechanisms 1341 configured as drum brakes. The friction brake mechanism 1341 generally includes a brake drum 1342 and brake shoes 1344 (shown in FIGS. 13C and 13D). The brake drum 1342 is rotatably fixed to a shaft 1343 that may extend through the friction brake mechanism 1341. The brake shoes 1344 are pivotably grounded to the vehicle body 102, for example, via a backing plate 1346 of the friction brake mechanism 1341, which may be coupled to the gearbox 234. The brake shoes 1344 are pivotable relative to the backing plate 1346, so as to move into and out of engagement with an inner periphery of the brake drum 1342 and slow rotation of the shaft 1343. The friction brake mechanism 1341, by being a brake drum, may be self-energizing and may further be self-energizing in only one direction of rotation (as indicated by arrows of the shaft 1343 and the brake drum 1342 in FIGS. 13C and 13D).

The shaft 1343 is an appropriate shaft corresponding to the locations of the friction brake mechanisms discussed above (i.e., the rotor assembly 632*b* with either of the friction brake mechanism 741, 1141; the intermediate shaft assembly 634*a* with the friction brake mechanism 841; the output shaft assembly 634*b* with either of the friction brake mechanisms 941, 1041). Hereinafter with reference to the friction brake mechanism 1341, the shaft 1343 is identified as the shaft 1343, but should be understood to be any of the rotor assembly 632*b*, the intermediate shaft assembly 634*a*, or the output shaft assembly 634*b*.

Figures 13A, 13B:
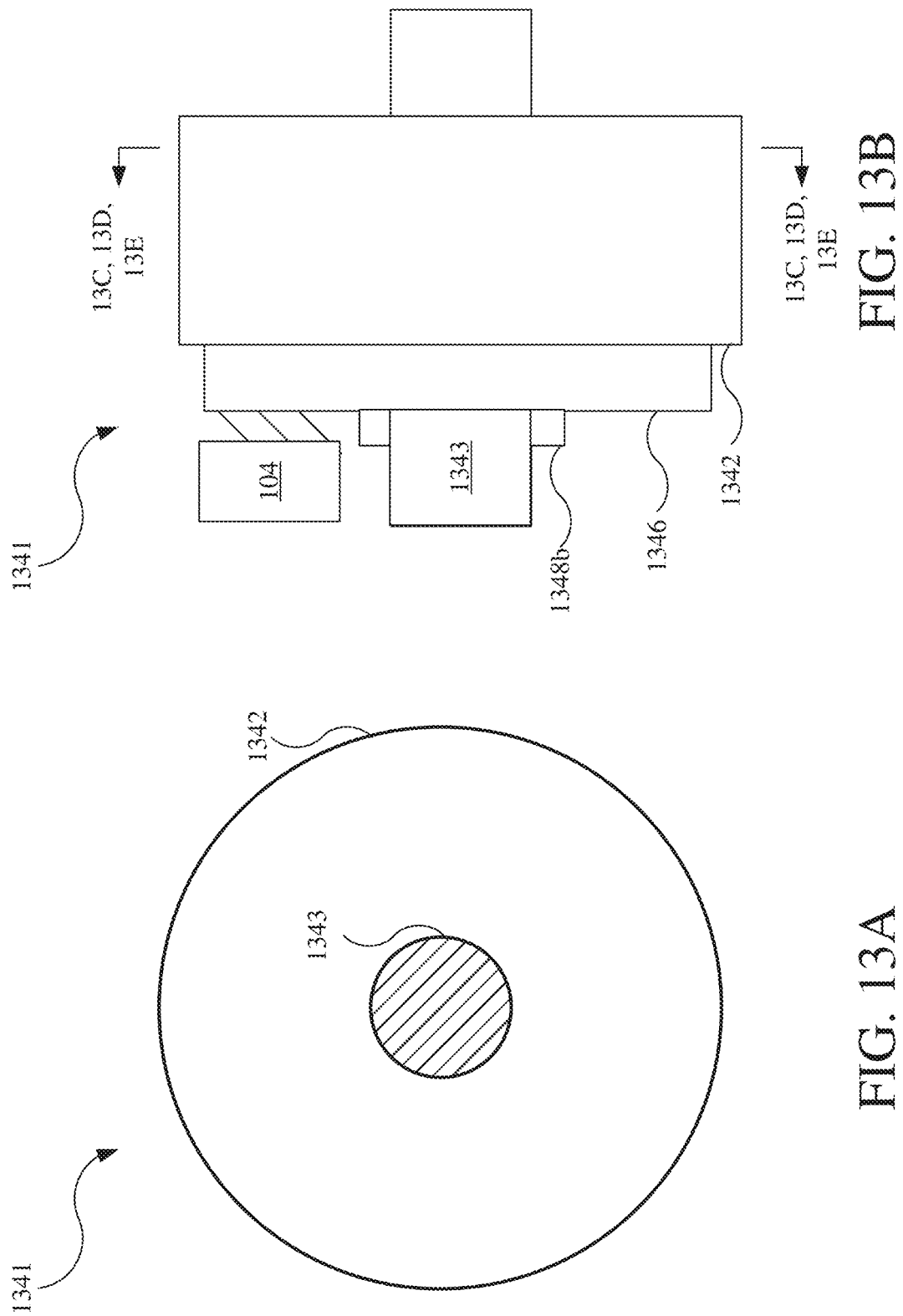
FIG. 13A is a front view of another friction brake mechanism of any of the friction braking systems of FIGS. 7-10.
FIG. 13B is a side view of the friction brake mechanism of FIG. 13A.
Figure 13D:
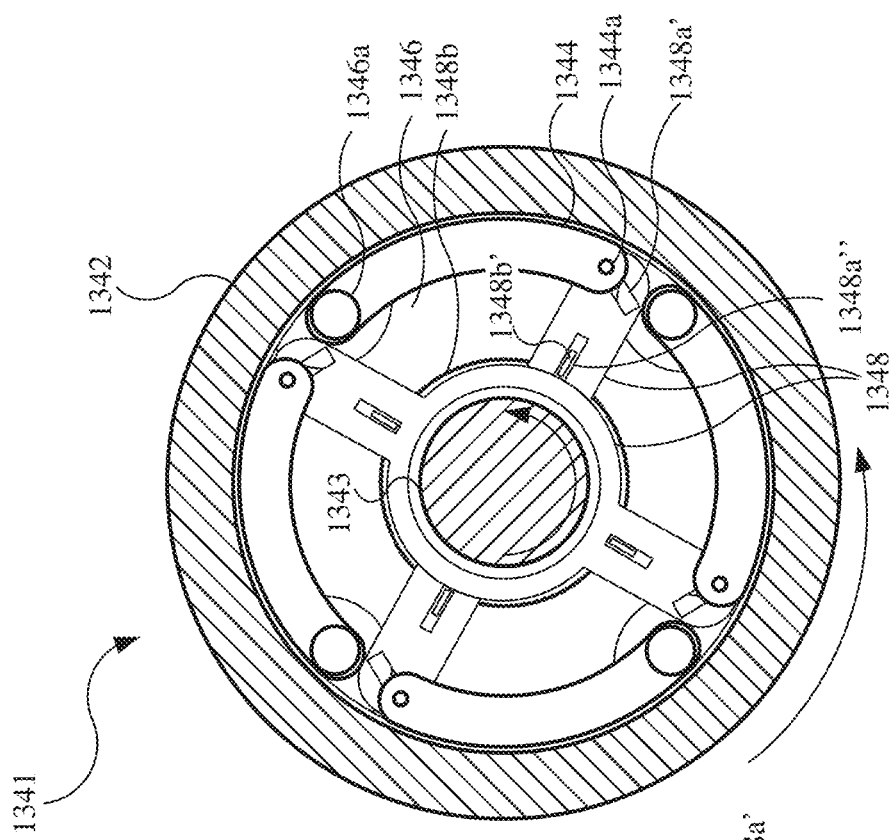
FIG. 13D is a cross-sectional view of the friction brake mechanism taken along line 13D-13D in FIG. 13B.
Figure 13C:
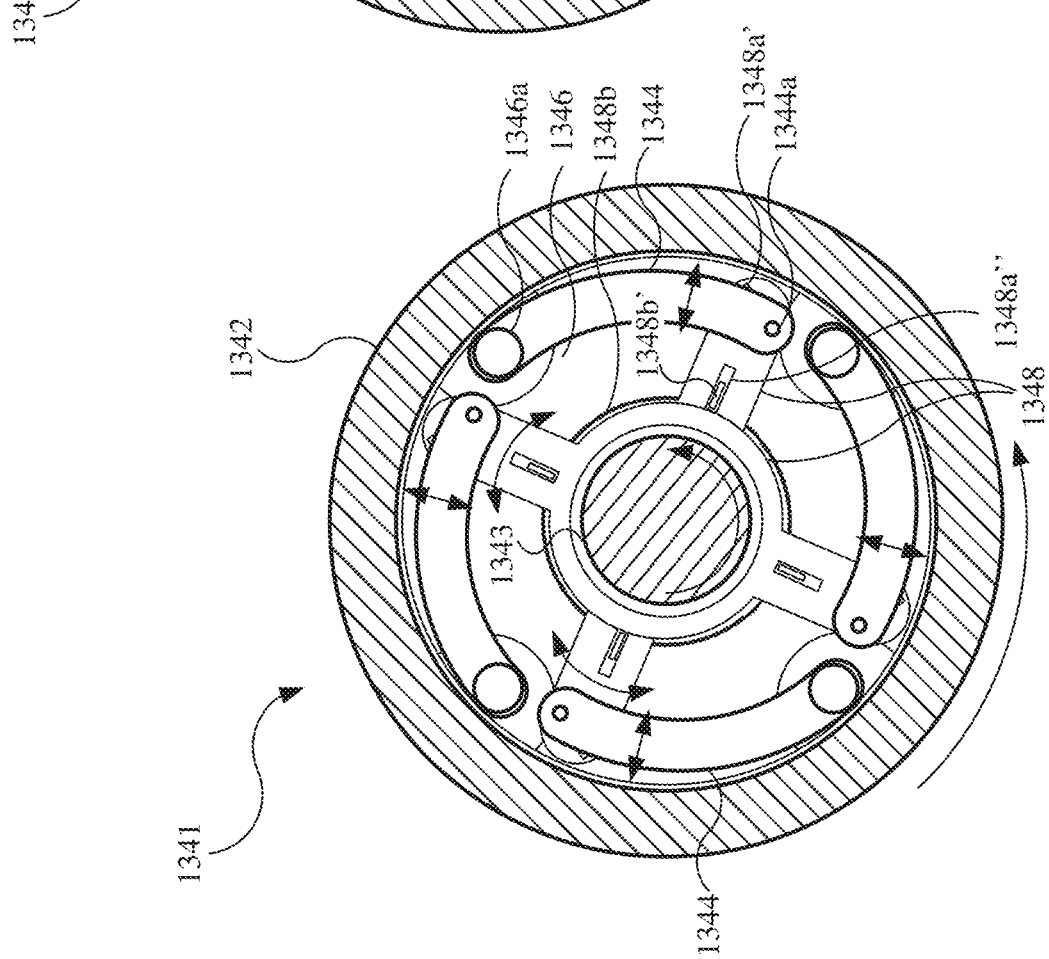
FIG. 13C is a cross-sectional view of the friction brake mechanism taken along line 13C-13C in FIG. 13B.

Referring to FIGS. 13C and 13D, the brake shoes 1344 are pivotable between a disengaged position (see FIG. 13C) and an engaged position (see FIG. 13D) in which the brake shoes 1344 engage the brake drum 1342. Each brake shoe 1344 is coupled to the backing plate 1346 and is pivotable about a pin 1346*a* thereof or other hinge point. Rather than a pin 1346*a*, for example, the brake shoes 1344 and the backing plate 1346 may form sliding interfaces with complementary curvatures, which may shift the pivot point radially outward to optimize engagement (e.g., pressure distribution) of the brake shoes 1344 to the brake drum 1342. For example, the brake shoes 1344 may have concave outer curvatures, while the backing plate 1346 forms complementary bosses that protrude radially inward to be received within the recesses. A sliding interface is formed therebetween with a pivot point nearer, coextensive with, or radially outward of the inner periphery of the brake drum 1342. Furthermore, rather than pivoting, the brake shoes 1344 may be fixed to the backing plate 1346, and be compliant to be movable into engagement with the brake drum 1342.

Figure 13E:
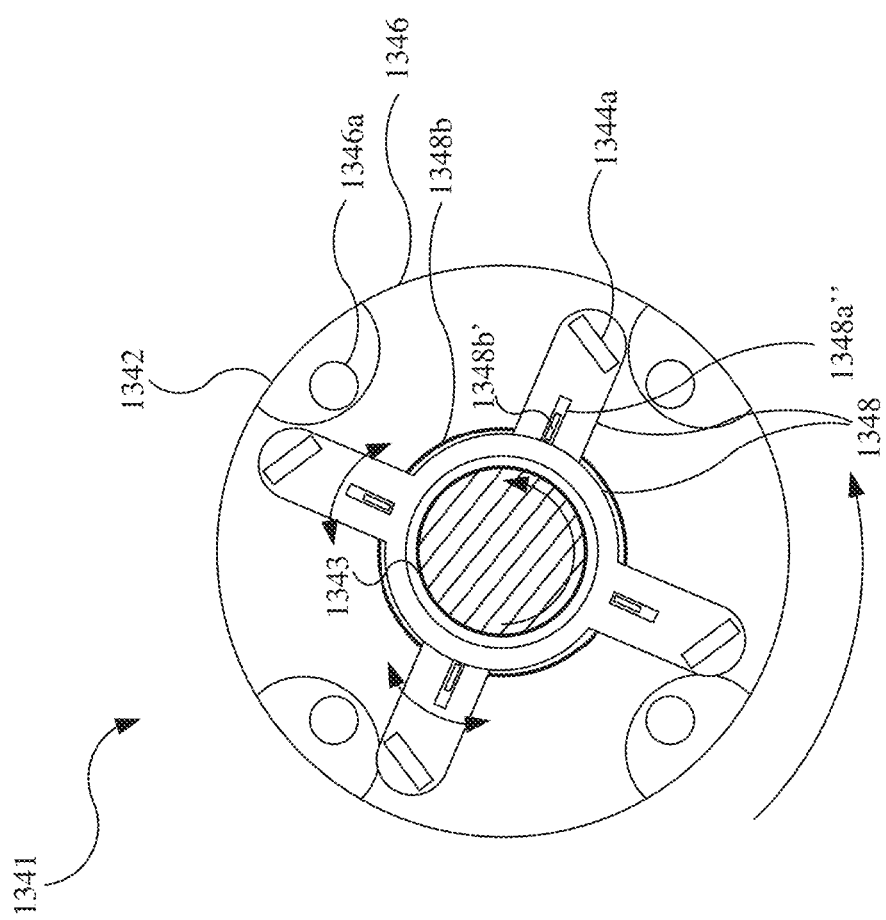
FIG. 13E is s partial cross-sectional view of the friction brake mechanism taken along line 13E-13E, which omits brake shoes of the friction brake mechanism.

The brake shoes 1344 are pivoted by actuation members 1348*a* (e.g., actuation bars, or linkage members). Each actuation member 1348*a* operatively couples each brake shoe 1344 with an opposing brake shoe 1344 (i.e., forming a pair of brake shoes 1344 on opposite sides of the brake drum 1342). The actuation member 1348*a* may slide radially relative to the brake drum 1342, which ensures that equal force is applied from the actuation member 1348*a* to each brake shoe 1344 of the pair. Force is, thereby, balanced force from the brake shoes 1344 to the brake drum 1342. As shown, the friction brake mechanism 1341 includes two pairs of brake shoes 1344 and two associated actuation members 1348*a*; however, the friction brake mechanism 1341 may include any suitable even number of brake shoes 1344. The actuation members 1348 may also be viewed in FIG. 13E, which is a partial cross-sectional view of the friction brake mechanism 1341, which omits the brake shoes 1344.

The actuation member 1348*a* functions as a cam member that is rotated in a small range of motion to bias the brake shoes 1344 radially outward into engagement with the brake drum 1342 and radially inward out of engagement with the brake drum 1342. For example, as shown, the actuation member 1348*a* includes cam slots 1348*a*' at each end thereof, which have received therein slide members 1344*a* (e.g., pins) of the pair of brake shoes 1344. As the actuation member 1348*a* is rotated in one direction (e.g., clockwise as shown), a radially inward surface thereof engages a radially inward surface of the slide member 1344*a* to bias the end of the brake shoe 1344 outward and pivot the brake shoe 1344 outward into engagement with the brake drum 1342 (see FIG. 13D). As the actuation member 1348*a* is rotated in another or opposite direction (e.g., counterclockwise as shown), a radially outward surface thereof engages a radially outward surface of the slide member 1344*a* to bias the end of the brake shoe 1344 inward and pivot the brake shoe 1344 inward out of engagement with the brake drum 1342 (see FIG. 13C).

An angle of the radial inner surface of the cam slot 1348*a*' relative to a tangential direction determines the radial force applied by the actuation member 1348 to the brake shoes 1344 and, in turn, the brake shoes 1344 to the brake drum 1342. The radial inner surface of the cam slot 1348*a*' may have a constant angle or may vary, for example, to initially move the brake shoes 1344 toward the brake drum 1342 and subsequently with high force, or vice versa (i.e., initially with high force, and subsequently with quick movement). As an alternative to the cam slot 1348*a*' having two sides, the cam slot 1348*a*' may instead be one-sided, engaging the slide member 1344*a* with only the radially inner surface, while a spring functions to return or bias the brake shoe 1344 away from the brake drum 1342. As an alternative to the cam slot 1348*a*', the actuation member 1348 may instead be rotated to engage a radially inward surface of the brake shoe 1344 to bias the brake shoe 1344 outward into engagement with the brake drum 1342, while a spring biases (e.g., pulls or rotates) the brake shoe 1344 inward and out of engagement with the brake drum 1342.

The actuation members 1348*a* are rotated by an actuation shaft 1348*b*. The actuation shaft 1348*b*, for example, includes protrusions 1348*b*' that extend into radially-extending slots 1348*a*" of the actuation members 1348*a*. As the actuation shaft 1348*b* is rotated in either direction, the protrusions 1348*b*' engage outer surfaces of the radially-extending slots 1348*a*" to pivot the actuation members 1348*a*. As force is balanced between the pair of brake shoes 1344 operated by the actuation member 1348, the actuation member 1348 may move radially as the protrusions 1348*b*' of the actuation shaft 1348*b* slide within the radially-extending slots 1348*a*". The actuation shaft 1348*b* operates (i.e., pivots) all actuation members 1348*a*. Additionally, the shaft 1343 passes through central apertures of the actuation members 1348 and a central bore of the actuation shaft 1348*b*.

The actuation shaft 1348*b*, and thereby the actuation members 1348*a*, are rotated by a motor-generator (not shown) with appropriate gear reduction for increased torque. The motor-generator may be direct drive, or geared (e.g., planetary, spur, or helical) for increasing torque output. It should be noted that the actuation shaft 1348*b* pivots in a short range of motion that is dictated by the length and radial location of the cam slots 1348*a*' of the actuation members 1348*a*. The range of motion may, for example, less than 15 degrees. In one example, the actuation shaft 1348*b* may include or be coupled to a sector gear that is engaged by a pinion of the motor-generator to be rotated thereby. In another example, a belt may extend between an output of the motor and pulley of the actuation shaft 1348*b* for the motor to rotate the actuation shaft 1348*b*. In yet another example, the motor-generator may be coupled to a linear actuator (e.g., lead screw, ball screw, or roller screw), which is in turn coupled to the actuation shaft 1348*b* via a linkage (e.g., lever). As a still further alternative, the motor-generator may be concentric with the shaft 1343 (e.g., as a hollow motor) with the stator being coupled to the actuation shaft 1348*b* and the stator being coupled to ground.

To facilitate cooling, the brake drum 1342 may include fins, for example, to increase surface area and/or to function as a fan to pull air through the fins and around the drum.

Figure 14A:
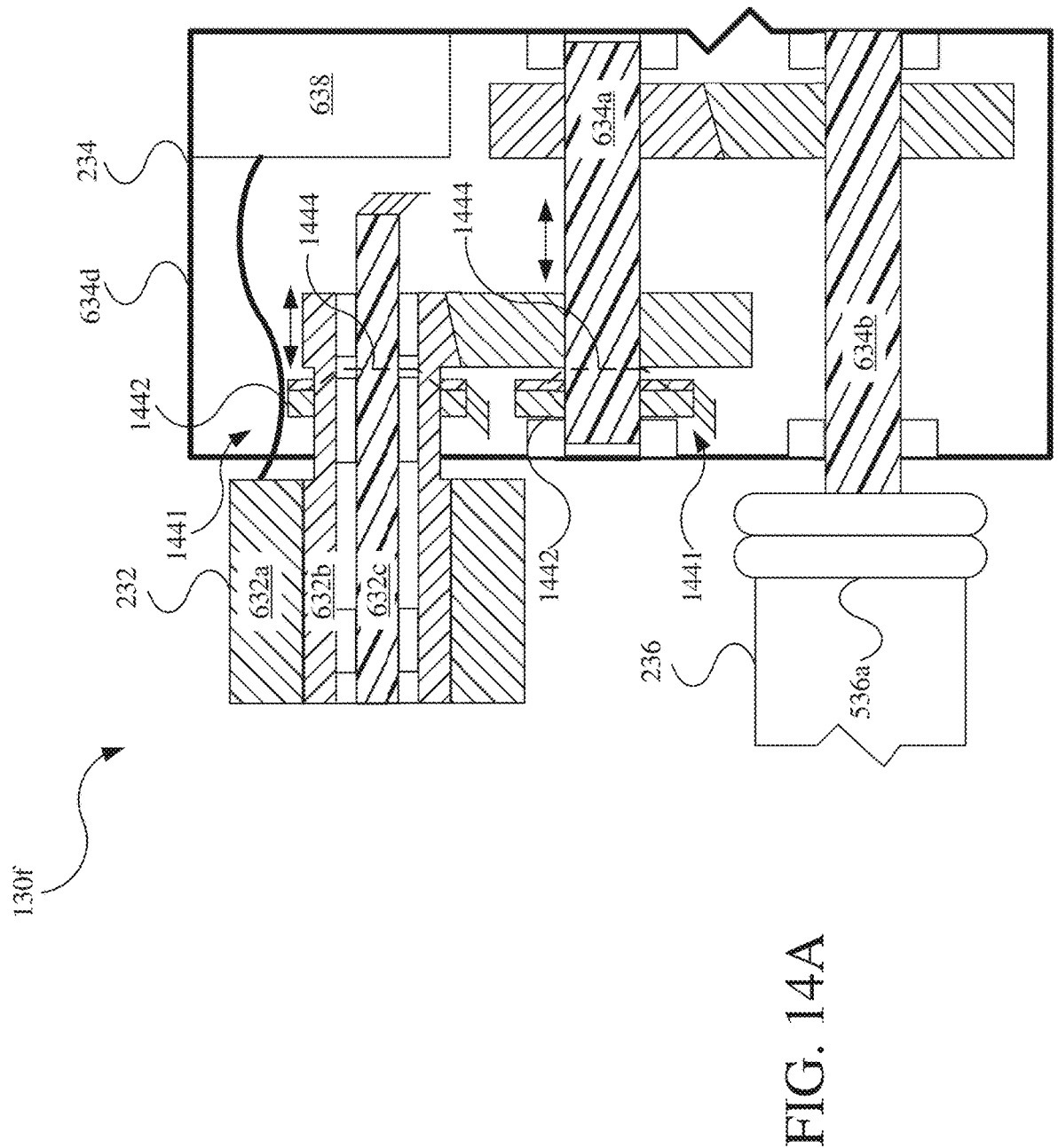
FIG. 14A is a partial cross-sectional view of another embodiment of the propulsion system and another embodiment of a friction braking system of the vehicle of FIG. 1, which is in a first state.
Figure 14B:
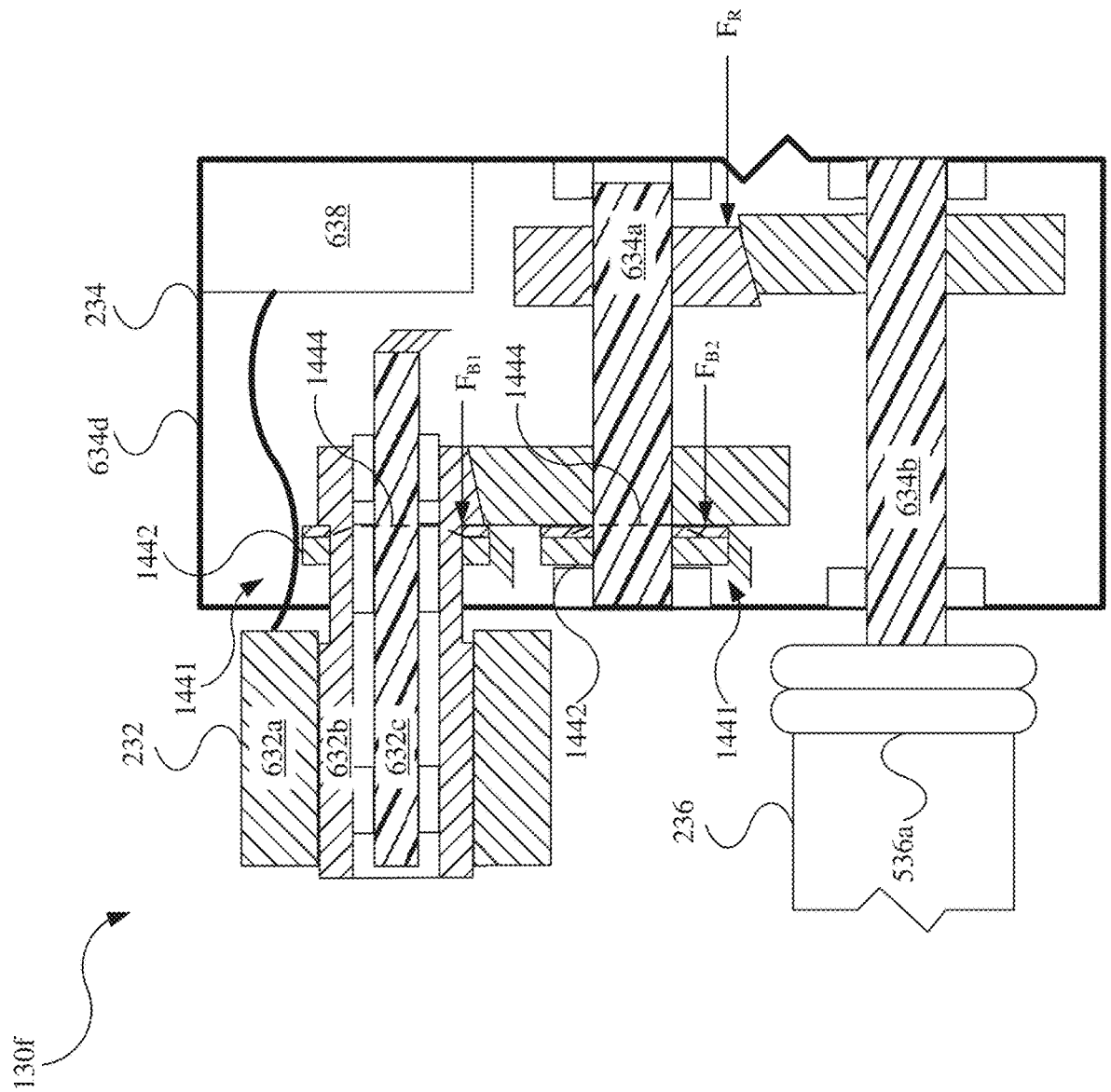
FIG. 14B is a partial cross-sectional view of the propulsion system and the friction braking system of FIG. 14A, which is in a second state.

Referring to FIGS. 14A-14B, the friction braking system 140 includes one or more friction brake mechanisms 1441, which are passively operated (i.e., without direct actuation) with onset high deceleration torque transferring through the propulsion system 130. More particularly, the propulsion system 130 utilizes helical gears to transfer torque between components, such that when the magnitude of torque transfer is increased (e.g., during a high deceleration event), various components are biased axially into contact with grounded friction elements.

Each friction brake mechanism 1441 is provided within the gearbox 234, and multiple friction brake mechanisms 1441 may be associated with each wheel 104. For example, as shown in FIGS. 14A-14B, two friction brake mechanisms 1441 are provided for the front left wheel 104.

The friction brake mechanism 1441 generally includes a friction member 1442 and a spring 1444, while the various shafts of the propulsion system 130 (e.g., the rotor assembly 632*c*, the intermediate shaft assembly 634*a*, and the output shaft assembly 634*b*) include helical gears (shown; not labeled). The friction member 1442 is grounded, for example, being coupled to the housing 634*c* of the gearbox 234.

Each spring 1444 (e.g., a Belleville washer) biases one of the shafts of the propulsion system 130 axially away from the friction member 1442. For example, the spring 1444 may be compressed between the friction member 1442 and the gear (or other annular member) of the shaft. Appropriate bearings may additionally be arranged between the friction member 1442, the spring 1444, and the gear (or other portion of the shaft) to reduce friction and wear.

During normal driving conditions, low levels of deceleration torque are transferred between the helical gears of the various shafts. As a result, low levels of axial force act between the helical gears. These low levels of axial force are insufficient to overcome the force of the springs 1444, such that the shafts do not move axially (see FIG. 14A).

During a high deceleration event, high levels of deceleration torque (e.g., generated by the motor 232 and transferred to the wheel 104) between the helical gears the various shafts. These high levels of axial force are of sufficient to overcome the force of the springs 1444 and compress the spring 1444, such that the respective shafts translate axially. As a result, axial faces of the helical gears (or other annular members) of the rotor assembly 632*c* and the intermediate shaft assembly 634a engage the friction members 1442 (see FIG. 14B) to generate deceleration torque.

The output shaft assembly 634b if fixed axially in the gearbox 234 (e.g., having a thrust washer) to provide an axial reaction force $F_R$. The reaction force $F_R$ is ultimately transferred as axial braking forces $F_{B1}$ and $F_{B2}$ to the friction brake mechanisms 1441 to both generate deceleration torque and overcome the forces of the spring 1444. These axial reaction force $F_R$ and the axial braking forces $F_{B1}$ and $F_{B2}$ are a function of the input torque (i.e., the deceleration torque introduced by the motor 232 and transferred to the wheel 104) and the geometry of the helical gears (e.g., relative diameters and tooth geometry).

Referring to FIGS. 15A and 15B, a propulsion system 1530 is configured to provide additional deceleration torque in high deceleration events using another motor of the vehicle (e.g., of the propulsion system 1530). The motor may, for example, primarily have another function (e.g., torque vectoring) but may be selectively operated to provide added deceleration torque in high deceleration situations.

The propulsion system 1530 (e.g., a rear propulsion system) generally includes a drive motor 1532 (e.g., a motor-generator), a differential 1534, and a torque vectoring system 1536. The drive motor 1532 transfers torque to/from the differential 1534, for example, via intermediate reducing gears (e.g., a gear train). The reducing gears may, for example, include an input drive gear 1538a, which transfers torque to/from a pinion of the drive motor 1532, and an output gear 1538b, which transfers torque to/from the differential 1534. The differential 1534, in turn, transfers torque from the drive motor 1532 to the driven wheels 104 coupled thereto, while allowing unequal rotation therebetween. The input drive gear 1538a and the output gear 1538b are rotatably fixed to each other via a shaft 1538c. The output gear 1538b has a smaller diameter than the input drive gear 1538a, so as to reduce rotational speed and increase torque from the drive motor 1532.

The torque vectoring system 1536 normally operates to distribute torque between wheels 104 (e.g., a rear left wheel 104, and a rear right wheel 104). The torque vectoring system 1536 generally includes a torque vectoring gearbox 1536a and a torque vectoring motor 1536b. The torque vectoring gearbox 1536a may, for example, include a planetary gear set, which receives input torque from the torque vectoring motor 1536b for applying differential torque between the driven wheels 104 for stability of the vehicle 100. For example, the torque vectoring motor 1536b may selectively apply torque to a planet carrier 1536a' of the torque vectoring gearbox 1536a (or other suitable input). The differential 1534 and the torque vectoring system 1536, including the various gears thereof, may be provided as a combined gearbox (e.g., the gearbox 234). Furthermore, braking system 140 may be used in conjunction with the propulsion system 1530 with the inboard friction brakes configured and/or located as described previously (e.g., as with the friction brake mechanisms 541, 741, 841, 941, 1041, 1141, 1241, 1341, 1441). In one example, the differential 1534 and the torque vectoring gearbox 1536a are provide as a single gearbox with an inboard friction brake contained therein.

In one example, the propulsion system 1530 is a rear propulsion system with the rear wheels being driven wheels. The braking system 140 may include friction brakes for applying braking torque to the rear wheels, which may be outboard brakes or inboard brakes as described previously (e.g., within the single gearbox forming the differential and/or not forming unsprung weight). Instead, or additionally, the braking system 140 may include friction brakes for applying braking torque to the front wheels, which may be outboard brakes or inboard brakes as described previously (e.g., not forming unsprung weight).

During normal operation, the torque vectoring motor 1536b is engaged with the torque vectoring gearbox 1536a to provide torque thereto (i.e., for distributing torque between the wheels 104) (see FIG. 15A). For example, a pinion gear 1536c of the torque vectoring motor 1536b may be engaged with an input of the torque vectoring gearbox 1536a.

During a high deceleration event, the torque vectoring motor 1536b is instead engaged with the output gear 1538b, which otherwise transfers torque between the differential 1534 and the drive motor 1532. For example, the pinion gear 1536c of the torque vectoring motor 1536b may be moved axially (e.g., by an actuator; not shown) on an output shaft 1536d of the torque vectoring motor 1536b out of engagement with the torque vectoring gearbox 1536a and into engagement with the input drive gear 1538a. As a result, both the drive motor 1532 and the torque vectoring motor 1536b may simultaneously provide deceleration torque via the input drive gear 1538a to the differential 1534 and, ultimately, the wheels 104. In such case and if friction brakes are provided for applying deceleration torque to the driven wheels 104, the friction brakes, instead of the torque vectoring motor 1536b, may provide unequal torque to the driven wheels for vehicle stability. The torque vectoring motor 1536b may be connected to the input drive gear 1538a in the same manner to provide additional drive torque to the differential 1534 provide supplemental drive torque for accelerating the vehicle.

A synchromesh unit may be used to ensure proper engagement (e.g., receipt) of the pinion gear 1536c of the torque vectoring motor 1536b with the input drive gear 1538a. Alternatively, the positions and/or speeds of each of the input drive gear 1538a and the pinion gear 1536c of the torque vectoring 1536b may be known/detected and/or controlled (e.g., by the sensing system 170) to ensure proper engagement (e.g., receipt) of the pinion gear 1536c.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. A vehicle comprising:
 a body;
 at least one driven wheel;
 a propulsion system comprising:
  a motor-generator; and
  a gearbox having a housing and a shaft rotatably coupled to the motor-generator, the at least one driven wheel being driven by the motor-generator via the shaft of the gearbox;
 a braking system having a friction brake, the friction brake is positioned at least partially within the housing of the gearbox and is coupled to the shaft, the friction brake configured for decelerating the at least one driven wheel; and a control system configured to cooperatively operate the propulsion system and the braking system to decelerate the vehicle,
wherein the control system is configured to operate the propulsion system and the braking system to decelerate the vehicle during a high deceleration event, and
wherein the control system is configured to operate the propulsion system without operating the braking system to decelerate the vehicle during a low deceleration event.

2. The vehicle of claim 1, wherein the propulsion system further comprises a drive shaft and a constant velocity joint coupling the shaft of the gearbox to the at least one driven wheel.

3. The vehicle of claim 1, wherein the control system operates the propulsion system and the braking system cooperatively to decelerate the vehicle without human control.

4. The vehicle of claim 1, wherein the vehicle further includes an active suspension system that controls movement of the at least one driven wheel relative to the body of the vehicle.

5. The vehicle of claim 4, wherein the active suspension system includes actuators that are operated by the control system to move the at least one driven wheel up and down relative to the body.

6. The vehicle of claim 1, wherein the shaft of the gearbox comprises an intermediate shaft rotatably coupled to the motor-generator, wherein the friction brake is coupled to the intermediate shaft.

7. The vehicle of claim 1, wherein the shaft of the gearbox comprises an output shaft rotatably coupled to the motor-generator, wherein the friction brake is coupled to the output shaft.

8. A vehicle comprising:
a body;
a first driven wheel and a second driven wheel; and
a propulsion system comprising:
a first motor-generator;
a differential; and
a torque vectoring system comprising a second motor-generator,
wherein the first motor-generator provides a first torque to the differential for transfer to the first driven wheel and the second driven wheel, and
wherein the second motor-generator of the torque vectoring system is in-coupled to the differential and provides a second torque to the differential to supplement the first torque during a high deceleration event.

9. The vehicle of claim 8, wherein the second motor-generator of the torque vectoring system is coupled to a torque vectoring gearbox and provides the second torque to the torque vectoring gearbox for distribution between the first driven wheel and the second driven wheel during normal operation.

10. The vehicle of claim 9, wherein the torque vectoring system includes a pinion gear configured to be rotated by the second motor-generator, with the pinion gear movable alternately between coupling with the differential and coupling with the torque vectoring gearbox.

11. The vehicle of claim 9, further comprising a braking system having a first friction brake that applies a first braking torque to the first driven wheel and a second friction brake that applies a second braking torque to the second driven wheel.

12. The vehicle of claim 11, wherein the first friction brake and the second friction brake are disposed inboard, and the differential and the torque vectoring gearbox are configured as a single gearbox that contains the first friction brake and the second friction brake.

13. A deceleration system for a vehicle, comprising:
a motor-generator,
a gearbox comprising an input shaft rotatably coupled to and driven by the motor-generator and an output shaft configured to be rotatably coupled to a wheel of the vehicle; and
a friction brake mounted to one of the motor-generator and the gearbox and rotatably coupled to the output shaft of the gearbox,
wherein the motor-generator is configured to apply a first torque to the output shaft for decelerating the vehicle and the friction brake is configured to apply a second torque to the output shaft for decelerating the vehicle.

14. The deceleration system of claim 13, further comprising a control system configured to cooperatively operate the motor-generator and the friction brake to decelerate the vehicle,
wherein the control system is configured to operate the motor-generator to apply the first torque to the output shaft to decelerate the vehicle during a low deceleration event, and
wherein the control system is configured to operate the motor-generator to apply the first torque to the output shaft and the friction brake to apply the second torque to the output shaft to decelerate the vehicle during a high deceleration event.

15. The deceleration system of claim 13, wherein the friction brake is at least partially disposed within the gearbox.

16. The deceleration system of claim 13, wherein the friction brake is at least partially disposed within the motor-generator.

17. A vehicle comprising:
a body;
at least one driven wheel;
a propulsion system having a motor-generator, with the at least one driven wheel being driven by the motor-generator, the motor-generator applies a first torque to the at least one driven wheel for decelerating the vehicle;
a braking system having a friction brake for decelerating the at least one driven wheel, the friction brake applies a second torque to the at least one driven wheel for decelerating the vehicle; and
a control system configured to cooperatively operate the propulsion system and the braking system to decelerate the vehicle,
wherein the control system is configured to operate the propulsion system and the braking system to decelerate the vehicle during a high deceleration event,
wherein the control system is configured to operate the propulsion system without operating the braking system to decelerate the vehicle during a low deceleration event,
wherein in the low deceleration event, the control system operates the motor-generator to apply the first torque and does not operate the friction brake such that the second torque is zero, and in the high deceleration event, the control system operates the friction brake for the second torque to be at a constant level and operates the motor-generator for the first torque to supplement the second torque.

18. A vehicle comprising:
a body;

at least one driven wheel;

a propulsion system having a motor-generator, with the at least one driven wheel being driven by the motor-generator;

a braking system having a friction brake for decelerating the at least one driven wheel; and a control system configured to cooperatively operate the propulsion system and the braking system to decelerate the vehicle, wherein the control system is configured to operate the propulsion system and the braking system to decelerate the vehicle during a high deceleration event, wherein the control system is configured to operate the propulsion system without operating the braking system to decelerate the vehicle during a low deceleration event, and wherein the control system limits operation of the vehicle according to a condition of the friction brake.

19. The vehicle of claim 18, wherein the condition of the friction brake includes one or more of a temperature of the friction brake or a time from the high deceleration event using the friction brake.

20. The vehicle of claim 19, wherein the vehicle limits operation of the vehicle by one or more of preventing movement of the vehicle or limiting a speed of the vehicle.

* * * * *